(12) United States Patent
Shao et al.

(10) Patent No.: US 12,332,637 B2
(45) Date of Patent: Jun. 17, 2025

(54) INDUSTRIAL INTERNET OF THINGS, CONTROL METHODS, AND STORAGE MEDIUMS FOR AUTOMATIC EXECUTING PRODUCT MANUFACTURING BASED ON TASKS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Junyan Zhou, Chengdu (CN); Xiaojun Wei, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 388 days.

(21) Appl. No.: 18/045,172

(22) Filed: Oct. 9, 2022

(65) Prior Publication Data
US 2023/0054470 A1 Feb. 23, 2023

(51) Int. Cl.
*G05B 19/418* (2006.01)
(52) U.S. Cl.
CPC ......... *G05B 19/41865* (2013.01); *G05B 2219/34418* (2013.01)

(58) Field of Classification Search
None
See application file for complete search history.

(56) References Cited

U.S. PATENT DOCUMENTS

2014/0031965 A1\* 1/2014 Sun .................. G06Q 10/06
700/100

\* cited by examiner

*Primary Examiner* — Ryan A Jarrett
(74) *Attorney, Agent, or Firm* — METIS IP LLC

(57) ABSTRACT

The present disclosure provides an Industrial Internet of Things for automatic executing product manufacturing based on a task, comprising a task module, a process processing module, and an analysis module. The task module is configured to generate a product manufacturing task and a first instruction corresponding to the product manufacturing task, the process processing module is configured to determine manufacturing process information based on the first instruction, decompose the manufacturing process information and generate sub-process manufacturing data, and the analysis module is configured to compose a set of manufacturing data based on the sub-process manufacturing data and the process execution time, perform a manufacturing feasibility analysis based on the set of manufacturing data, in response to a determination that an analysis result of the manufacturing feasibility analysis is feasible, perform the product manufacturing corresponding to sub-process based on the sub-process manufacturing data.

18 Claims, 7 Drawing Sheets

400

```
┌─────────────────────────────────────────────────────────────────────────┐
│ When the user platform generates the product manufacturing task based   │ 410
│ on a user, sending the product manufacturing task to a main platform of │
│ the service platform as a first instruction, and the first instruction  │
│ at least including product information and manufacturing volume         │
│ information in the product manufacturing task                           │
└─────────────────────────────────────────────────────────────────────────┘
                                    │
                                    ▼
┌─────────────────────────────────────────────────────────────────────────┐
│ After receiving the first instruction, the main platform of the service │ 420
│ platform retrieving pre-stored manufacturing process information of a   │
│ corresponding product based on the product information, and decomposing │
│ the process based on the manufacturing process information, obtaining a │
│ plurality of sub-process information sorted by the sequence of the      │
│ process execution time, extracting a plurality of sub-process name      │
│ information corresponding to the plurality of sub-process information,  │
│ and sending the sub-process information and the manufacturing volume    │
│ information to the sub-platforms of the service platform corresponding  │
│ to sub-process names based on the sub-process name information          │
└─────────────────────────────────────────────────────────────────────────┘
                                    │
                                    ▼
┌─────────────────────────────────────────────────────────────────────────┐
│ After receiving the sub-process information and the manufacturing       │ 430
│ volume information, the sub-platforms of the service platform           │
│ calculateing a total manufacturing time of the sub-process, integrating │
│ the sub-process information, the manufacturing volume information, and  │
│ the total manufacturing time as a corresponding sub-process             │
│ manufacturing data and sending the corresponding sub-process            │
│ manufacturing data to a main platform of the management platform        │
└─────────────────────────────────────────────────────────────────────────┘
                                    │
                                    ▼
┌─────────────────────────────────────────────────────────────────────────┐
│ The main platform of the management platform receiving all sub-process  │ 440
│ manufacturing data and composing the set of manufacturing data based on │
│ the sequence of process execution time, and performing the              │
│ manufacturing feasibility analysis based on the set of manufacturing    │
│ data, in response to a determination that an analysis result of the     │
│ manufacturing feasibility analysis is feasible, the main platform of    │
│ the management platform executing the following operations              │
└─────────────────────────────────────────────────────────────────────────┘
                                    │
                                    ▼
┌─────────────────────────────────────────────────────────────────────────┐
│                                                                         │ 450
│ Sending all the sub-process manufacturing data to sub-platforms of the  │
│ management platform corresponding to the sub-process                    │
│                                                                         │
└─────────────────────────────────────────────────────────────────────────┘
                                    │
                                    ▼
┌─────────────────────────────────────────────────────────────────────────┐
│ After receiving the sub-process manufacturing data, the sub-platforms   │ 460
│ of the management platform performing object platform matching, and     │
│ sending the sub-process manufacturing data to the sensor network        │
│ platform                                                                │
└─────────────────────────────────────────────────────────────────────────┘
                                    │
                                    ▼
┌─────────────────────────────────────────────────────────────────────────┐
│ The sensor network platform receiving the sub-process manufacturing     │ 470
│ data and sending the sub-process manufacturing data to the at least     │
│ one object platform that is matched, and the at least one object        │
│ platform receiving the sub-process manufacturing data and executing     │
│ the product manufacturing of the corresponding sub-process based on     │
│ the sub-process manufacturing data                                      │
└─────────────────────────────────────────────────────────────────────────┘
```

```
┌─────────────────────────────────────────────────────────────────┐  510
│ Processing required material information, standard quality parameters, and │
│ sub-process categories of the sub-process based on the prediction model   │
│ corresponding to the sub-process, and determining a loss rate of          │
│ manufacturing material of the sub-process                                 │
└─────────────────────────────────────────────────────────────────┘
                                 │
                                 ▼
┌─────────────────────────────────────────────────────────────────┐  520
│ Determining an actual required volume of the manufacturing material of the │
│ sub-process based on the loss rate and manufacturing volume information   │
└─────────────────────────────────────────────────────────────────┘
                                 │
                                 ▼
┌─────────────────────────────────────────────────────────────────┐  530
│ Determining manufacturing material feasibility based on the actual required │
│ volume and an inventory balance corresponding to the manufacturing         │
│ material                                                                   │
└─────────────────────────────────────────────────────────────────┘
```

FIG. 5

INDUSTRIAL INTERNET OF THINGS, CONTROL METHODS, AND STORAGE MEDIUMS FOR AUTOMATIC EXECUTING PRODUCT MANUFACTURING BASED ON TASKS

TECHNICAL FIELD

The present disclosure relates to intelligent manufacturing technology, and in particular to Industrial Internet of Things, control methods, and storage mediums for automatic executing product manufacturing based on task.

BACKGROUND

In the field of product intelligent manufacturing, intelligent manufacturing equipment automatically executes the manufacturing of the corresponding process of the product according to task instructions and data, and utilizes the corresponding product production line to gradually complete the manufacturing of the entire product to form the final product.

In the prior art, the process of many similar products or similar parts, accessories, materials, etc. in the product are basically the same or similar, but the specific manufacturing parameters may be different. Many of the differences are in the dimensions, specifications, raw materials, and process conditions. Since the manufacturing parameters of manufacturing equipment are mostly adjustable range values, these differences are achievable when manufacturing using the same manufacturing equipment. Moreover, in the existing intelligent manufacturing, in order to meet the production conditions of the entire production line, such as the production line balance rate, the manufacturing tasks of many manufacturing equipment have not reached saturation, and there are still many spare working-hours, that is, manufacturing of a certain number of products or accessories can be added to the existing manufacturing tasks.

When the intelligent manufacturing equipment on the assembly line is in the execution of the intelligent manufacturing process, due to processing and order requirements, it is often necessary to perform some emergency manufacturing tasks or temporary manufacturing tasks for products. But the intelligent manufacturing equipment cannot stop production when the entire assembly line is performing manufacturing, otherwise, it will affect the current manufacturing of the established products and cause heavy losses. Because the intelligent manufacturing equipment is interconnected, it is impossible to stop a certain equipment. As a result, manufacturing cannot be performed in time when encountering an emergency or temporary manufacturing task, thereby affecting the implementation of the task.

Based on above, how to use the spare working-hours of intelligent manufacturing equipment and the characteristics of performing the same or similar processes to solve the urgent product manufacturing tasks or temporary manufacturing tasks in the process of performing other manufacturing tasks is an urgent problem that needs to be solved.

SUMMARY

One of the embodiments of the present disclosure provides an Industrial Internet of Things for automatic executing product manufacturing based on a task. The Industrial Internet of Things may include a task module, a process processing module, and an analysis module. The Industrial Internet of Things may include a user platform, a service platform, a management platform, a sensor network platform, and at least one object platform interacting sequentially from top to bottom. The user platform may be used as an executor of the task module, the service platform may be used as an executor of the process processing module, and the management platform, the sensor network platform, and the at least one object platform may be used as executors of the analysis module. The task module may be configured to generate a product manufacturing task and a first instruction corresponding to the product manufacturing task. The process processing module may be configured to determine manufacturing process information based on the first instruction, the manufacturing process information including sub-process information sorted by a sequence of process execution time, decompose the manufacturing process information and generate sub-process manufacturing data. The analysis module may be configured to compose a set of manufacturing data based on the sub-process manufacturing data and the process execution time, perform a manufacturing feasibility analysis based on the set of manufacturing data, and in response to a determination that an analysis result of the manufacturing feasibility analysis is feasible, perform the product manufacturing corresponding to sub-process based on the sub-process manufacturing data.

One of the embodiments of the present disclosure provides a control method of an Industrial Internet of Things for automatic executing product manufacturing based on a task. The Industrial Internet of Things may include: a user platform, a service platform, a management platform, a sensor network platform, and at least one object platform interacting sequentially from top to bottom. The method may include operations: a product manufacturing task and a first instruction corresponding to the product manufacturing task may be generated, manufacturing process information may be determined based on the first instruction, the manufacturing process information includes sub-process information sorted by a sequence of process execution time, the manufacturing process information may be decomposed and sub-process manufacturing data may be generated; a set of manufacturing data may be composed based on the sub-process manufacturing data and the process execution time, a manufacturing feasibility analysis may be performed based on the set of manufacturing data, and in response to a determination that an analysis result of the manufacturing feasibility analysis is feasible, the product manufacturing corresponding to the sub-process may be performed based on the sub-process manufacturing data.

One of the embodiments of the present disclosure provides a non-transitory computer-readable storage medium storing computer instructions, when reading the computer instructions in the storage medium, a computer implements the method of an Industrial Internet of Things for automatic executing product manufacturing based on a task described in any of the above embodiments.

Compared with the prior art, the beneficial effects of the present disclosure are as follows: the present disclosure builds the Internet of Things based on five platform structures, and the service platform and the management platform all adopt the front sub-platform arrangement, the service platform or the main platform of the management platform receives, analyzes and processes the data of the upper-layer platform in a unified manner, so as to facilitate the processing and classification of the data of the upper-layer platform and each sub-platform, and each sub-platform corresponding to the main platform operates independently of each other, which can be divided into several independent data processing paths based on requirements, and then use different paths for data processing and transmission for different data, so that the data processing pressure of the corresponding main platform can be shared, and the data processing capacity requirements of each sub-platform can be reduced. In addition, it can also ensure the independence of each data, ensure the classified transmission, traceability of data, and classified issuance and processing of instructions, making the structure and data processing of the Internet of Things clear and controllable, and facilitating the management and control of the Internet of Things and data processing. At the same time, the sensor network platform adopts a centralized arrangement, which can control all data transmission through a data transmission center, reduce the dispersion of data transmission, and facilitate the centralized transmission of data. It can also ensure that the transmission of all data can be managed and controlled in a unified manner to realize the smooth implementation of intelligent manufacturing tasks through the reasonable framework structure of the Internet of Things.

When the present disclosure is in use, when needing to complete newly-added product manufacturing task, the user platform sends out the first instruction based on newly-added product manufacturing task, the first instruction is processed by the main platform of the service platform to form sub-process information, and the product manufacturing data in the task is formed into each process data that is convenient for implementation. The user platform extracts the process information according to the process data, sends the process data to the independent sub-platforms of the service platform corresponding to the process information based on the process information, and then realize the automatic decomposition and classification of tasks. Sub-platforms of different service platforms are used to receive and process for different processes, which can reduce the data processing pressure of sub-platforms of each service platform and ensure that data is not affected by each other. In addition, the sub-platforms of the service platform may also perform calculation processing according to the process data, obtain the process manufacturing data of the corresponding process, and form a unified data source. When the main platform of the management platform receives all the process manufacturing data, it can integrate all the data for performing manufacturing feasibility analysis, and determine the execution of the current task through the manufacturing feasibility analysis, and then automatically determine whether the task is executable, to ensure that the task execution is safe and reliable. When the task is executable, the main platform of the management platform sends the manufacturing data of the corresponding process to the sub-platforms of the management platform, and the sub-platforms of different management platforms also correspond to different processes independently, so that the corresponding sub-platforms of the management platform of different processes receive corresponding process manufacturing data of the process. When the sensor network platform receives the data of the corresponding sub-platforms of the management platform, the sub-platforms of the corresponding management platform may send the data to the corresponding object platform, which reduces the workload of subsequent data transmission and identification, so that the data transmission is faster and safer, thereby different object platforms receive different process manufacturing data and execute different intelligent manufacturing. Finally, the manufacture of the entire product can be realized and the new product manufacturing task can be completed.

BRIEF DESCRIPTION OF THE DRAWINGS

The present disclosure may be further explained by way of exemplary embodiments, which may be described in detail by means of the accompanying drawings. These examples are not limiting, in these examples, the same numbers refer to the same structures, wherein:

FIG. 4 illustrates another exemplary flowchart of the control method of the Industrial Internet of Things for automatic executing product manufacturing based on the task according to some embodiments of the present disclosure;

FIG. 5 illustrates an exemplary flowchart of determining the feasibility of manufacturing material according to some embodiments of the present disclosure;

DETAILED DESCRIPTION

Figure 1:
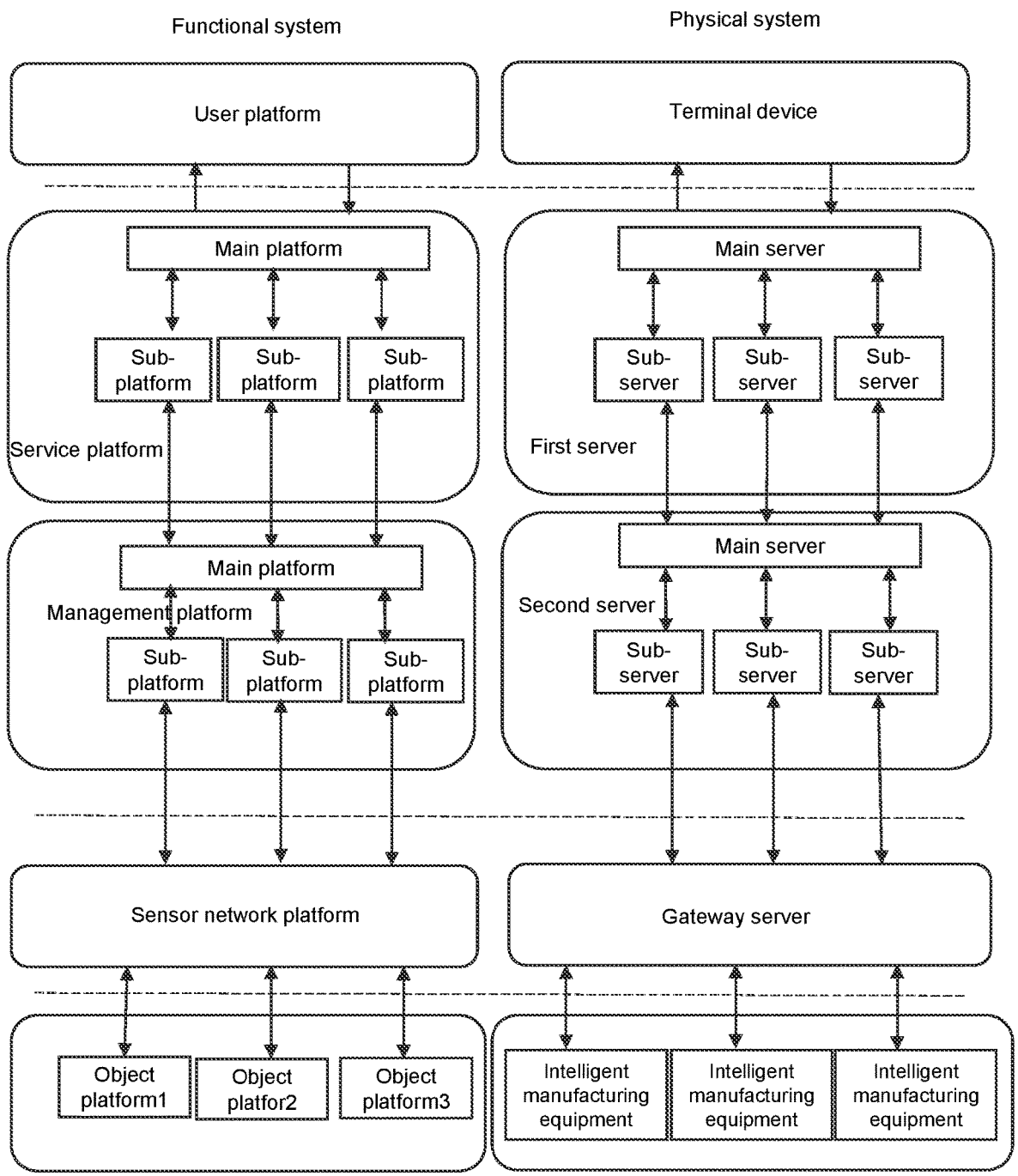
FIG. 1 illustrates a structural frame diagram of the Industrial Internet of Things for automatic executing product manufacturing based on the task according to some embodiments of the present disclosure.

In order to more clearly illustrate the technical solutions of the embodiments of the present disclosure, the following will briefly introduce the drawings that need to be used in the description of the embodiments. Obviously, the drawings in the following description are only some examples or embodiments of the disclosure. For those of ordinary skill in the art, without creative work, the disclosure can be applied to other similar scenarios according to these drawings. Unless it is obvious from the language environment or otherwise stated, the same reference numbers in the drawings represent the same structure or operation.

It should be understood that the "system", "device", "unit" and/or "module" used herein is a method for distinguishing different components, elements, parts, parts, or assemblies of different levels. However, if other words can achieve the same purpose, the words can be replaced by other expressions.

As shown in the present disclosure and the claims, unless the context clearly suggests exceptional circumstances, the words "a", "an", and/or "the" do not only specifically refer to the singular, but also include the plural. Generally speaking, the terms "including" and "contain" only suggest that the operations and elements that have been clearly identified are included, and these operations and elements do not constitute an exclusive list, and the method or device may also include other operations or elements.

Flowcharts are used in the present disclosure to describe operations performed by a system according to an embodiment of the present disclosure. It should be understood that the preceding or following operations are not necessarily performed in the exact order. Instead, the various operations may be processed in reverse order or simultaneously. Also, other operations may be added to these procedures, or an operation or operations may be removed from these procedures.

FIG. 1 illustrates a structural frame diagram of the Industrial Internet of Things for automatic executing product manufacturing based on the task according to some embodiments of the present disclosure.

As shown in FIG. 1, the first embodiment of the present disclosure aims to provide an Industrial Internet of Things for automatic executing product manufacturing based on a task. The Industrial Internet of Things may include a user platform, a service platform, a management platform, a sensor network platform, and at least one object platform interacting sequentially from top to bottom.

Both the service platform and the management platform may adopt a front sub-platform arrangement, and the sensor network platform may adopt a centralized arrangement. The front sub-platform arrangement means that the service platform and the management platform may be provided with a main platform and a plurality of sub-platforms, the plurality of sub-platforms may store and process data of different types or different receiving objects sent by a lower-level platform respectively, and the main platform may aggregate, store and process the data of the plurality of sub-platforms, and transmit the data to an upper-level platform. The centralized arrangement means that the sensor network platform uniformly may receive data, uniformly process data, and uniformly send data.

When the user platform generates the product manufacturing task based on a user, the product manufacturing task may be sent to a main platform of the service platform as a first instruction, and the first instruction may at least include product information and manufacturing volume information in the product manufacturing task.

After receiving the first instruction, the main platform of the service platform may retrieve pre-stored manufacturing process information of a corresponding product based on the product information, and decompose the process based on the manufacturing process information, obtain a plurality of sub-process information sorted by the sequence of the process execution time, and extract a plurality of sub-process name information corresponding to the plurality of sub-process information, send the sub-process information and the manufacturing volume information to the sub-platforms of the service platform corresponding to sub-process names based on the sub-process name information.

After receiving the sub-process information and the manufacturing volume information, the sub-platforms of the service platform may calculate a total manufacturing time of the sub-process, integrate the sub-process information, the manufacturing volume information, and the total manufacturing time as a corresponding sub-process manufacturing data and send the corresponding sub-process manufacturing data to a main platform of the management platform.

The main platform of the management platform may receive all sub-process manufacturing data and compose the set of manufacturing data based on the sequence of process execution time, and perform the manufacturing feasibility analysis based on the set of manufacturing data, in response to a determination that an analysis result of the manufacturing feasibility analysis is feasible, the main platform of the management platform may execute the follow operations.

All the sub-process manufacturing data may be sent to sub-platforms of the management platform corresponding to the sub-process.

After receiving the sub-process manufacturing data, the sub-platforms of the management platform may perform object platform matching, and send the sub-process manufacturing data to the sensor network platform.

The sensor network platform may receive the sub-process manufacturing data and send the sub-process manufacturing data to the at least one matched object platform, and the at least one matched object platform may receive the sub-process manufacturing data and execute the product manufacturing of the corresponding sub-process based on the sub-process manufacturing data.

It should be noted that the physical architecture of the Industrial Internet of Things may include: a user platform configured as a terminal device for interacting with users; a service platform configured as a first server for receiving an instruction from the user platform and sending the instruction to the management platform, and extracting the information needed to process the user platform from the management platform and sending the information to the user platform; the management platform configured as a second server for controlling the object platform running and receiving feedback data from the object platform; a sensor network platform configured as a communication network and a gateway for the interaction between the object platform and the management platform; the object platform configured as an intelligent manufacturing device that performs manufacturing. Since this part belongs to a relatively common structure in the prior art, the embodiment may not describe redundantly.

Prior art in the field of intelligent manufacturing technology, the product types of many enterprises are mostly similar or products in the same type (iterative products) have different versions. The processing of the similar products, the products in the same type and similar parts and accessories in the similar products and the products in the same type are basically the same or similar. In order to save facility costs, most enterprises can use a certain assembly line to realize the manufacture of multiple similar products or products in the same type with different versions. Similar products and iterative products in an enterprise may only have some structural differences. Most of the structures are common or the same, many of structural differences are reflected in size, raw materials, and process conditions. Since the manufacturing parameters of manufacturing equipment are mostly adjustable range values, these differences are achievable when manufacturing using the same manufacturing equipment. Moreover, in the existing intelligent manufacturing, in order to meet the production conditions of the entire production line, such as the production line balance rate, the manufacturing tasks of many manufacturing equipment have not reached saturation, and there is still many spare working-hours, that is, manufacturing of a certain number of products or accessories can be added to the existing manufacturing tasks. When the intelligent manufacturing equipment on the assembly line is in the execution of the intelligent manufacturing process, due to processing and order requirements, it is often necessary to perform some emergency manufacturing tasks or temporary manufacturing tasks for products. But the intelligent manufacturing equipment cannot stop production when the entire assembly line is performing manufacturing, otherwise, it will affect the current manufacturing of the established products and cause heavy losses. Because the intelligent manufacturing equipment is interconnected, it is impossible to stop a certain equipment. As a result, manufacturing cannot be performed in time when encountering an emergency or temporary manufacturing task, thereby affecting the implementation of the task. When certain product manufacturing is needed to execute as soon as possible due to production needs, order changes, temporary tasks, and urgent tasks, the production line equipment cannot be stopped, resulting in the inability to perform manufacturing in time when new manufacturing tasks are encountered, which affects the implementation of tasks.

Based on above, the present disclosure utilizes spare working-hours and the characteristics of performing same or similar product manufacturing of existing assembly line intelligent manufacturing equipment when manufacturing to solve the above problem. The present disclosure builds the Internet of Things based on five platform structures, and the service platform and the management platform all adopt the front sub-platform arrangement, the service platform or the main platform of the management platform receives, analyzes and processes the data of the upper-layer platform in a unified manner, so as to facilitate the processing and classification of the data of the upper-layer platform and each sub-platform, and each sub-platform corresponding to the main platform operates independently of each other, which may be divided into several independent data processing paths based on requirements, and then use different paths for data processing and transmission for different data, so that the data processing pressure of the corresponding main platform can be shared, and the data processing capacity requirements of each sub-platform can be reduced. It can also ensure the independence of each data, ensure the classified transmission, traceability of data, and classified issuance and processing of instructions, making the structure and data processing of the Internet of Things clear and controllable, and facilitating the management and control of the Internet of Things and data processing. At the same time, the sensor network platform adopts a centralized arrangement, which may control all data transmission through a data transmission center, reduce the dispersion of data transmission, and facilitate the centralized transmission of data. It can also ensure that the transmission of all data can be managed and controlled in a unified manner to realize the smooth implementation of intelligent manufacturing tasks through the reasonable framework structure of the Internet of Things. The implementation may not affect the smooth progress of the previous manufacturing task and does not need to stop the corresponding object platform.

When the present disclosure is in use, when needing to complete newly-added product manufacturing task, the user platform sends out the first instruction based on newly-added product manufacturing task, and the first instruction is processed by the main platform of the service platform to form sub-process information, and the product manufacturing data in the task is formed into each process data that is convenient for implementation The user platform extracts the process information according to the process data, sends the process data to the independent sub-platforms of the service platform corresponding to the process information based on the process information, and then realizes the automatic decomposition and classification issuance of tasks. Sub-platforms of different service platforms are used to receive and process for different processes, which can reduce the data processing pressure of sub-platforms of each service platform and ensure that data is not affected by each other. In addition, the sub-platforms of the service platform may also perform calculation processing according to the process data, obtain the process manufacturing data of the corresponding process, and form a unified data source. When the main platform of the management platform receives all the process manufacturing data, it may integrate all the data for performing manufacturing feasibility analysis, and determine the execution of the current task through the feasibility analysis, and then automatically determine whether the task is executable, to ensure that the task execution is safe and reliable. When the task is executable, the main platform of the management platform sends the manufacturing data of the corresponding process to the sub-platforms of the management platform, and the sub-platforms of different management platforms also correspond to different processes independently, so that the corresponding sub-platforms of the management platform of different processes receive corresponding process manufacturing data of the process. When the sensor network platform receives the data of the corresponding sub-platforms of the management platform, the sub-platforms of the corresponding management platform may send the data to the corresponding object platform, which reduces the workload of subsequent data transmission and identification, and the data transmission is faster and safer, thereby different object platforms receive different process manufacturing data and execute different intelligent manufacturing. Finally, the manufacture of the entire product is realized and the new product manufacturing task is completed.

It should be noted that the user platform in the embodiment may be a desktop computer, a tablet computer, a notebook computer, a mobile phone, or other electronic equipment capable of data processing and data communication, which is not limited here. In a specific application, the first server and the second server may be a single server or a server cluster, which is not limited here. It should be understood that the data processing process mentioned in the embodiment may be processed by the processor of the server, and the data stored in the server may be stored in a storage device of the server, such as a hard disk or other memory. In specific applications, the sensor network platform may use multiple groups of gateway servers or multiple groups of intelligent routers, which are not limited here. It should be understood that the data processing process mentioned in the embodiments of the present disclosure may be processed by the processor of the gateway server, and the data stored in the gateway server may be stored in the storage device of the gateway server, such as hard drive and SSD.

In some embodiments, intelligent manufacturing equipment may be various production line equipment that relies on the assembly line in product manufacturing. Taking mechanical products as an example, the intelligent manufacturing equipment may be parts assembly equipment, assembly equipment, detection equipment, etc. Further, taking the automobile engine assembly line as an example, the production line equipment may be cylinder block processing equipment, cylinder block positioning and turning equipment, cam assembly installation equipment, bolt assembly installation equipment, machine filter assembly, oiling equipment, etc. Taking cream cosmetics as an example, intelligent manufacturing equipment may be grinding equipment, mixing equipment, emulsification equipment, sterilization equipment, filling equipment and packaging equipment.

In some embodiments, the manufacturing process information may be all process information of product manufacturing, which at least includes a plurality of sub-process information. The sub-process information at least includes sub-process name information, manufacturing process parameter information, etc. The product information at least includes the product type, product model, and product name, etc.

It should be noted that the manufacturing volume information at least includes the product manufacturing volume and its corresponding accessory manufacturing/required volume, so that each subsequent sub-process may perform data operation or execute manufacturing corresponding to the accessory manufacturing/required volume.

In some embodiments, after the main platform of the service platform obtains the first instruction, in order to confirm and implement the product manufacturing task, it is necessary to confirm whether the intelligent manufacturing equipment may complete the product manufacturing task. Therefore, in the embodiment, based on the consideration, combined with the actual processing situation, the first instruction may be decomposed into processes, and the feasible situation of the task may be analyzed through the subsequent process. Based on this, the specific method of the process decomposition in the present embodiment is as follows.

After receiving the first instruction, the main platform of the service platform may retrieve a product information table pre-stored in the main platform of the service platform, and the product information table may at least include product type information and the manufacturing process information corresponding to the product type.

The product information table may be matched based on the product information in the first instruction to obtain a corresponding product type in the product information table or a similar product type that meets matching requirements.

The manufacturing process information of the product type or the similar product type that meets the matching requirements may be retrieved, the process may be decomposed based on the manufacturing process information, and the plurality of sub-process information sorted by the sequence of the execution process time may be obtained.

It should be noted that, when the product type corresponding to the product information in the first instruction is pre-stored in the product information table, matching may be directly completed, and when the product type of the product information in the first instruction may not directly match the product type corresponding to the product information in the first instruction, a similar product type may be selected according to the matching requirements, and the similar product type may be types of a similar product, an iterative product, etc. of the product type corresponding to the product information in the first instruction.

In some embodiments, the main platform of the service platform extracts a plurality of sub-process name information corresponding to the sub-process information, sends the sub-process information and the manufacturing volume information to sub-platforms of the service platform corresponding to sub-process names based on the sub-process name information including the following operations.

Each different sub-process corresponds to an independent sub-platform of the service platform.

When obtaining the plurality of sub-process information sorted by the sequence of the execution process time, the main platform of the service platform may extract the sub-process name information in each sub-process information respectively.

The sub-process information and the manufacturing volume information may be sent to the sub-platforms of the service platform corresponding to the sub-process names based on the sub-process name information.

In order to ease the data processing pressure of the sub-platforms of each service platform in the embodiment and ensure that the data of each sub-process is processed, transmitted, and stored independently of each other, and facilitate subsequent feasibility analysis, in the embodiment, each sub-platform of the service platform corresponds to an independent sub-process, so that each sub-process can independently perform data operations, and the data do not affect each other.

In some embodiments, since the processes of some iterative products and similar products are basically the same or similar, most of them are changes in some conventional processing conditions such as dimensions, raw materials, shape specifications, etc., based on this, when the product type cannot be directly matched, the following matching method may be used to match similar product types and perform data replacement.

The first instruction may further include task product manufacturing process information and task product manufacturing process parameters in the product manufacturing task.

When matching the product information table based on the product information in the first instruction, in response to a determination that the corresponding product type may be not matched, the manufacturing process information in the product information table may be matched based on the task product manufacturing process information.

When meeting the matching requirements, the product type corresponding to a matched manufacturing process information in the product information table may be used as the similar product type, and the task product manufacturing process information and the task product manufacturing process parameters may be used as the manufacturing process information of the similar product type for process decomposition.

In above-mentioned embodiments, the matching the manufacturing process information in the product information table based on the task product manufacturing process information may comprise the following operation:

All the sub-processes included in the task product manufacturing process information in sequence may be arranged to form a target set, and the manufacturing process information corresponding to each product type in the product information table may be used as independent comparison data, and all the sub-processes included in each independent comparison data may be arranged in sequence to form comparison sets.

The target set and each comparison set may be individually matched, in response to a determination that all the sub-processes in the target set may be matched to the sub-processes of the corresponding process name in the comparison set, the comparison set meets the matching requirements, and the product type corresponding to the comparison set may be used as the similar product type.

The present embodiment uses the above matching method to match the sub-processes in each comparison set by using the task product manufacturing process information, thereby, the similar product type closest to the task product process may be obtained by matching, so that the corresponding sub-process may be executed by using the similar product type subsequently.

It should be noted that, after the matching is performed, there may be a plurality of similar product types that may meet the matching requirements. There may be many product types that do not fit. For example, the assigned task is to manufacture the camshaft in the engine. According to the above matching method, as long as products meet the camshaft, the products meet the matching requirements. However, there may be many engines containing camshaft processing information, or engine assemblies containing camshaft processing information, etc. It is clear that engines, engine assemblies, etc. as similar product types do not quite fit the camshaft processing.

Based on this, in order to further increase the fit degree of the matching, after the above matching is completed, when there are multiple comparison sets that meet the matching requirements, execute the following operations.

Any comparison set may be taken as a benchmark, the sub-processes that match the target set may sequentially be selected, process sequence numbers of the sub-processes may be retrieved based on the product information table, and sequence number differences of all the process sequence numbers may be calculated.

The sequence number differences of all the comparison sets may be calculated, and the comparison set with a smallest sequence number difference may be selected as the comparison set that finally meets the matching requirements.

It should be noted that, in the process information, sequence numbering may be carried out to the process, that is, the process is continuous, and its corresponding numbering may also be continuous, which is generally referred to as the process sequence number in the manufacturing field, and the process sequence number is mostly a list of numbers sorted by Arabic numerals, such as 1, 2, 3, 4, 5, 6, . . . etc. When any comparison set is used as the benchmark to select the sub-processes that match the target set and calculate the sequence number difference of all process sequence numbers, if the corresponding comparison set is closer to the target set, it means that the two processes are more identical. Then, in the corresponding target set, the process sequence numbers of the corresponding sub-processes may be closer, and the interval between the sub-processes may not be too large. Therefore, the optimal comparison set may be obtained by using the size of the sequence number difference.

It should be noted that, after calculating the sequence number difference of all the comparison sets, when there are multiple comparison sets with the smallest sequence number difference at the same time, one of them may be selected as the optimal comparison set.

As a further supplement, the target set and each comparison set may individually be matched, if all the sub-processes in the target set may be not all matched to the sub-processes of the corresponding process names in a certain comparison set, it means that the product in the product manufacturing task may be a new product or a large difference from the existing manufactured product, so the same or similar products cannot be found in such cases, the following operations may be performed.

The main platform of the service platform may match the comparison set with more sub-process volume, arrange in descending order according to the matching volume, and retrieve the corresponding product types and their manufacturing process information in the first N comparison sets as feedback data.

The main platform of the service platform may generate a mismatch report and feed back to the user platform after the feedback data is arranged in descending order according to the matching volume.

The user platform may receive the mismatch report, and execute the following operations based on the mismatch report.

The product information, the manufacturing process information of the corresponding task product in the product manufacturing task, and the object platform matched based on the manufacturing process information may be sent to the main platform of the service platform as new product data.

The main platform of the service platform may receive the new product data and store the new product data in the product information table, and the user platform may issue the product manufacturing task again after completion.

After the main platform of the service platform receives the new product data, the new product data may be directly matched to perform subsequent operations.

In this embodiment, when unable to match, the user platform may use the manufacturing process of the N comparison sets to carry out matching of the process and the object platform through the feedback data, according to the corresponding information of the task product, by the matching mode of manually selecting, so as to form a complete and new product manufacturing data by using the feasible process information and object platform information in different comparison sets, which is stored in the product information table, so that the task product manufacturing may be completed by the cooperation of different processes in the current multiple product manufacturing.

It should be noted that, if the user platform cannot be executed by the matching mode of manually selecting, then it is indicated that the task product may not be manufactured automatically. At this time, it means that the task product does not belong to the same or similar production line as the existing manufacturing system, and the manufacturing may only be performed by manually debugging the object platform, adding or reducing the object platform, or resetting the assembly line. This belongs to another technical problem, so this embodiment does not further describe.

It should be noted that N in the above-mentioned N comparison sets is an integer greater than 1, and the value of N satisfies: when each sub-process in the target set is at least the same as the sub-process in more than two comparison sets, taking the first N comparison sets that meet this requirement as N comparison sets. Therefore, the user platform may have more choices when performing manual matching, and may also increase the success rate and accuracy of manual matching. In some embodiments, after matching to the comparison set, it indicates that the product manufacturing task satisfies the conditions in the actual manufacturing process. Although the process meets the conditions, in practical application, it is also necessary to consider whether the intelligent manufacturing equipment that performs the corresponding process may perform the manufacturing of the corresponding process, and whether the manufacturing materials in each process meet the requirements of the process. Therefore, a final manufacturing feasibility analysis needs to be carried out in combination with the above problems.

Based on this, the main platform of the management platform receives all sub-process manufacturing data and composes the set of manufacturing data based on the sequence of process execution time and performs the manufacturing feasibility analysis based on the set of manufacturing data including the following operations.

The main platform of the management platform may receive all the sub-process manufacturing data, and associate the manufacturing volume information corresponding to the sub-process information with the total manufacturing time in the sub-process manufacturing data.

All the sub-processes in the sub-process manufacturing data may be sorted according to the sequence of processes execution time based on the sub-process information to form the set of manufacturing data.

The manufacturing feasibility analysis may be performed based on the manufacturing datasets.

The manufacturing feasibility analysis includes the following operations.

Feasibility of manufacturing materials may be analyzed based on the manufacturing volume information in the set of the manufacturing data.

In response to a determination that the analysis result of the feasibility analysis of the manufacturing materials is feasible, an object platform feasibility may be analyzed based on the total manufacturing time in the set of manufacturing data, and in response to a determination that the analysis result of the feasibility analysis of the at least one object platform is feasible, it is determined that the set of the manufacturing data is feasible.

The embodiment firstly carries out the feasibility analysis of the manufacturing material, when the manufacturing material satisfies the manufacturing, then the feasibility analysis of the object platform is carried out, which confirms whether the intelligent manufacturing equipment may perform the manufacturing. In specific applications, the feasibility analysis of the object platform may also be carried out first, and then the feasibility analysis of the manufacturing materials may be carried out.

During specific implementation, the feasibility analysis of manufacturing material based on the manufacturing volume information in the set of the manufacturing data may include the following operations.

Each different sub-process corresponds to an independent sub-platform of the management platform.

The main platform of the management platform may retrieve manufacturing material information of the process in the sub-platforms of the management platform of the corresponding process based on the sub-process information, and calculate a manufacturable volume of the process based on the manufacturing material information.

The manufacturing volume information corresponding to each sub-process may be compared with the manufacturable volume of the sub-process.

When the manufacturable volume of the sub-process is greater than or equal to a required manufacturing volume of the manufacturing volume information, it is determined that the feasibility of manufacturing materials in the sub-process is feasible, otherwise, it is determined that the feasibility of manufacturing materials in the sub-process is infeasible.

The feasibility analysis of manufacturing material may be performed on each sub-process in the set of the manufacturing data, and the following operations may be executed based on all analysis results of the sub-processes.

In response to a determination that all the analysis results of feasibility analysis of the manufacturing materials of sub-process are feasible, the feasibility analysis of the at least one object platform may be performed.

In response to a determination that at least one of the analysis results of feasibility analysis of the manufacturing materials of sub-process is infeasible, it is determined that the manufacturing dataset is infeasible, and the manufacturing material information of an infeasible sub-process may be sent to the sub-platforms of the service platform in turn, and the sub-platforms of the service platform may send the manufacturing material information to the main platform of the service platform, and the main platform of the service platform may associate the manufacturing material information of each sub-process with the sub-process information and feeding it back to the user platform.

Further, when implementing, the in response to a determination that the analysis result of the feasibility analysis of the manufacturing materials is feasible, the feasibility analysis of the object platform may be performed based on the total manufacturing time in the set of manufacturing data, and in response to a determination that the analysis result of the feasibility analysis of the at least one object platform is feasible, it is determined that the set of the set of the manufacturing data is feasible, including the following operations.

Each different sub-process corresponds to an independent sub-platform of the management platform.

Based on the sub-process information, the main platform of the management platform may retrieve working-hour information of the at least one object platform of the sub-process in the sub-platforms of the management platform of the corresponding process, and calculate a sum of all spare working-hour information of the at least one object platform of the sub-process.

The total manufacturing time corresponding to each sub-process may be compared with the sum of the spare working-hour information of the sub-process.

When the sum of the spare working-hour information is greater than or equal to the total manufacturing time corresponding to the sub-process in the corresponding sub-process, it is determined that the object platform feasibility in the sub-process is feasible may be; otherwise, it is determined that the object platform feasibility in the sub-process is infeasible.

The feasibility analysis of the at least one object platform may be performed on each sub-process in the set of the manufacturing data, and the following operations may be executed based on all the analysis results of the sub-process.

In response to a determination that all the analysis results of the feasibility analysis of the at least one object platform in the sub-process are feasible, the set of the manufacturing data may meet manufacturing conditions, and a transmission of the sub-process manufacturing data may be performed.

In response to a determination that at least one of the analysis results of the feasibility analysis of the at least one object platform in the sub-process is infeasible, it is determined that the set of the manufacturing data is infeasible, the working-time information of the at least one object platform of an infeasible sub-process may be sent to the sub-platforms of the service platform in turn, the sub-platforms of the service platform may send the working-time information of the at least one object platform to the main platform of the service platform, and the main platform of the service platform may associate the working-hour information of the at least one object platform of each sub-process with the sub-process information and feed it back to the user platform.

It should be noted that there may be only one object platform corresponding to each sub-process, or there may be multiple parallel and independent object platforms, that is, one or more object platform may correspond to each sub-process in each comparison set. Therefore, after selecting the optimal comparison set, it is also necessary to match the corresponding object platforms to determine manufacturing volume performed by object platforms.

Based on this, in the embodiment, the after receiving the sub-process manufacturing data, the sub-platforms of the management platform perform object platform matching, and send the sub-process manufacturing data to the sensor network platform, including the following operations.

After receiving the sub-process manufacturing data, the sub-platforms of the management platform may calculate an executable manufacturing volume of each object platform in all the at least one object platform of the sub-process, and the executable manufacturing volume is obtained by dividing a spare working-hour information of each of at least one object platform by a single-piece working-hour.

All the executable manufacturing volumes of the at least one object platform may be sorted in descending order of numerical value, and the object platforms corresponding to top N executable manufacturing volumes may be selected as matching object platforms, and a sum of the top N executable manufacturing volumes is greater than or equal to a manufacturing volume in the manufacturing volume information.

The sub-platforms of the management platform may allocate an actual manufacturing volume corresponding to each matching object platform according to the manufacturing volume information, and a sum of the actual manufacturing volumes of all the matching object platforms are equal to the manufacturing volume in the manufacturing volume information.

The manufacturing volume information in the sub-process manufacturing data may be replaced with the actual manufacturing volume, and the replaced sub-process manufacturing data may be sent to the sensor network platform.

Through the above methods, the corresponding object platforms may be matched to perform the manufacture of the corresponding sub-processes, and the actual manufacturing volume corresponding to the sub-processes in the task may be replaced synchronously, so that the object platforms may be matched and the corresponding manufacturing volumes may be matched.

It should be noted that the sub-platforms of the management platform may allocate the actual manufacturing volume corresponding to each matched object platform according to the manufacturing volume information, as the concrete mode of allocation: when allocating, the sub-platforms of the management platform may allocate according to the executable manufacturing volume of the matched object platform until the allocation volume of all the object platforms finally meets the manufacturing volume information. It may also be allocated proportionally according to the executable manufacturing volume corresponding to each object platform to ensure that allocation volume of all the object platforms meets the manufacturing volume information after allocating.

Figure 2:
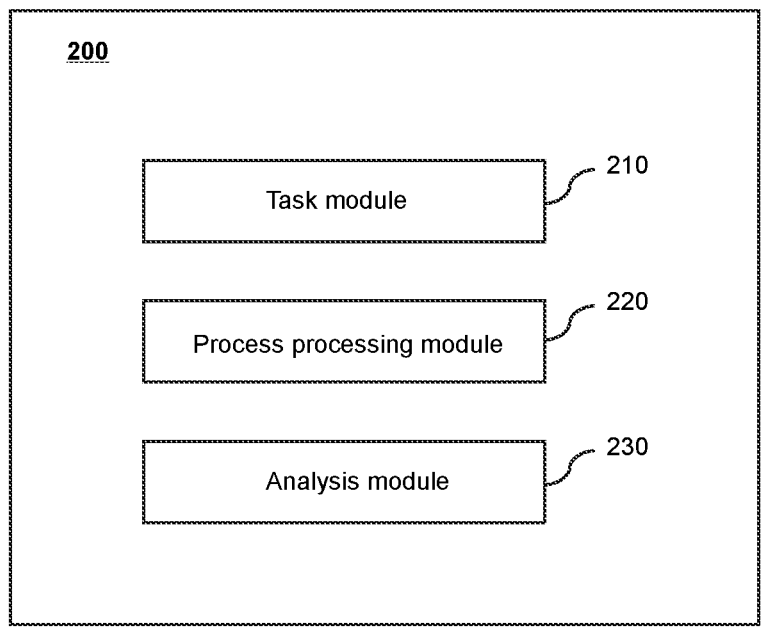
FIG. 2 illustrates an exemplary block diagram of the Industrial Internet of Things for automatic executing product manufacturing based on the task according to some embodiments of the present disclosure.

FIG. 2 illustrates an exemplary block diagram of the Industrial Internet of Things for automatic executing product manufacturing based on the task according to some embodiments of the present disclosure.

As shown in FIG. 2, the Industrial Internet of Things 200 for automatic executing product manufacturing based on the task may include a task module 210, a process processing module 220, and an analysis module 230.

In some embodiments, the Industrial Internet of Things may include a user platform, a service platform, a management platform, a sensor network platform, and at least one object platform interacting sequentially from top to bottom. The user platform may be used as an executor of the task module, the service platform may be used as an executor of the process processing module, the management platform, the sensor network platform, and the at least one object platform may be used as executors of the analysis module.

The task module 210 may be configured to generate a product manufacturing task and a first instruction corresponding to the product manufacturing task. More descriptions of the product manufacturing task and the first instruction may be found in FIG. 3 and related descriptions thereof.

The process processing module 210 may be configured to determine manufacturing process information based on the first instruction. The manufacturing process information may include sub-process information sorted by a sequence of process execution time. The process processing module 210 may be further configured to decompose the manufacturing process information and generate sub-process manufacturing data. More descriptions of determining manufacturing process information and generating sub-process manufacturing data, may be found in FIG. 3 and related descriptions thereof.

In some embodiments, to determine the pre-stored manufacturing process information of the product based on the first instruction, the process processing module 220 may be further configured to obtain product information based on the first instruction, and determine the manufacturing process information based on the product information. More descriptions of obtaining product information and determining the manufacturing process information may be found in FIG. 3 and related descriptions thereof.

In some embodiments, the analysis module 230 may be configured to compose a set of manufacturing data based on the sub-process manufacturing data and the process execution time, perform a manufacturing feasibility analysis based on the set of manufacturing data, and in response to a determination that an analysis result of the manufacturing feasibility analysis is feasible, perform the product manufacturing corresponding to sub-process based on the sub-process manufacturing data. More descriptions of composing the set manufacturing data, conducting a manufacturing feasibility analysis, and performing product manufacturing of corresponding sub-processes, may be found in FIG. 3 and related descriptions thereof.

In some embodiments, to perform manufacturing feasibility analysis based on the set of the manufacturing data, a corresponding prediction model is provided for each of the plurality of sub-processes, and for each of the plurality of sub-processes, the analysis module 230 may further be configured to process required material information, standard quality parameters, and sub-process categories of the sub-process based on the prediction model corresponding to the sub-process, and determine a loss rate of manufacturing material of the sub-process, determine an actual required volume of the manufacturing material of the sub-process based on the loss rate and manufacturing volume information, and determine manufacturing material feasibility based on the actual required volume and an inventory balance corresponding to the manufacturing material. More descriptions of determining the manufacturing material feasibility may be found in FIG. 5 and related descriptions thereof.

In some embodiments, the analysis module 230 may be further configured to obtain the prediction model corresponding to each sub-process in the plurality of the sub-processes through joint training. The joint training may include: obtaining the training samples and labels corresponding to each sub-process, the training samples including the required material information, the standard quality parameters, and the sub-process categories corresponding to each sub-process, and the labels including the loss rate of the manufacturing material required for each sub-process, inputting the training samples and the labels into an initial prediction model corresponding to each sub-process, and determining a prediction result corresponding to each sub-process, constructing a loss term corresponding to each sub-process based on the prediction result and the labels, determining a weight of the loss term corresponding to each sub-process based on a production sequence of the plurality of sub-processes, determining a loss function by fusing the loss terms corresponding to each sub-process based on the weight, and synchronously updating parameters of the initial prediction model corresponding to each sub-process based on the loss function, and ending the training when a preset condition is met. More descriptions of obtaining prediction models through joint training may be found in FIG. 6 and related descriptions thereof.

In some embodiments, the analysis module 230 may be further configured to construct a feature vector based on product type, manufacturing process information, and manufacturing volume information, determine a total manufacturing time of each sub-process by searching in a vector database based on the feature vector, and determine an object platform feasibility by comparing the total manufacturing time of each sub-process with a space time of the at least one object platform corresponding to the sub-process. More descriptions of determining the object platform feasibility may be found in FIG. 7 and related descriptions thereof.

In some embodiments, the analysis module 230 may be further configured to determine a production plan feasibility of each sub-process based on the manufacturing material feasibility or the object platform feasibility of each sub-process.

It should be noted that the above description of the Industrial Internet of Things 200 for automatic executing product manufacturing based on the task and its modules is only for the convenience of description, and cannot limit the description to the scope of the illustrated embodiments. It can be understood that for those skilled in the art, after understanding the principle of the system, various modules may be combined arbitrarily, or a subsystem may be formed to connect with other modules without departing from the principle. In some embodiments, the task module 210, the process processing module 220 and the analysis module 230 disclosed in FIG. 2 may be different modules in a system, or may be a module that implements the functions of two or more modules described above. For example, each module may share one storage module, and each module may also have its own storage module. Such deformations are all within the protection scope of the present disclosure.

Figure 3:
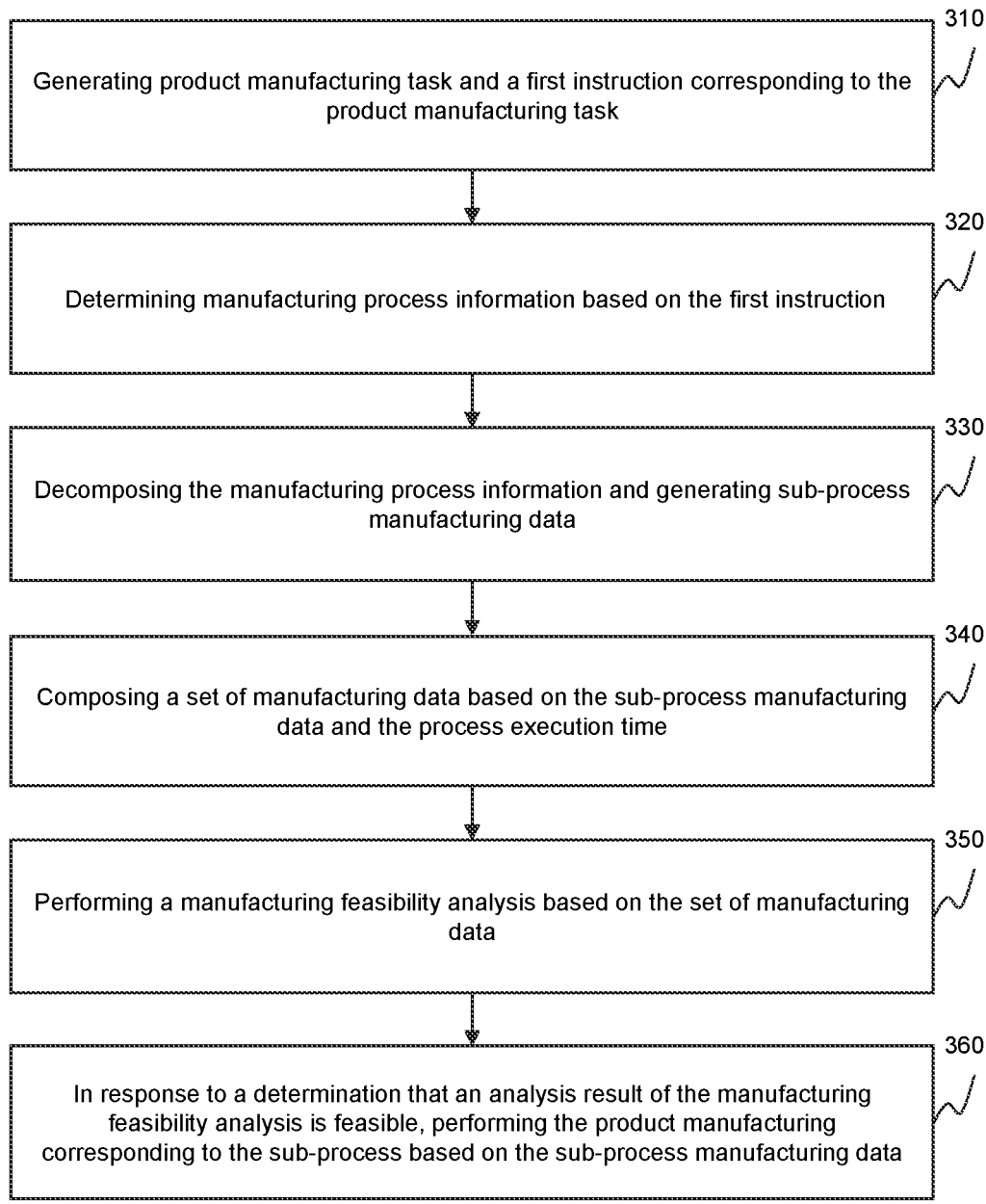
FIG. 3 illustrates an exemplary flowchart of the control method of the Industrial Internet of Things for automatic executing product manufacturing based on the task according to some embodiments of the present disclosure.

FIG. 3 illustrates an exemplary flowchart of the control method of the Industrial Internet of Things for automatic executing product manufacturing based on the task according to some embodiments of the present disclosure. As shown in FIG. 3, the process 300 may include the following operations. In some embodiments, the process 300 may be performed by the Industrial Internet of Things 200 for automatic executing product manufacturing based on the task.

In operation 310, generating product manufacturing task and a first instruction corresponding to the product manufacturing task. In some embodiments, the operation 310 may be performed by the task module 210.

A product manufacturing task may refer to manufacturing work of a product that needs to be done or product-related manufacturing work, for example, completing parts production for 100 products, etc.

The first instruction may refer to a data request corresponding to a product manufacturing task. For example, the first instruction may be to produce 1000 products. In some embodiments, the first instruction may include product information, manufacturing volume information, etc. in the product manufacturing task. The product information may at least include the product type, product model, product name, etc. of the product, and the manufacturing volume information may at least include the product manufacturing volume and the corresponding manufacturing/required volume of the accessories.

In some embodiments, the task module 210 may generate product manufacturing tasks based on the input of users. For example, the task module 210 may receive a product manufacturing task input by a user through a terminal device. The task module 210 may receive the product manufacturing task, and may send the product manufacturing task as a first instruction to the process processing module 220.

In operation 320, determining manufacturing process information based on the first instruction, the manufacturing process information including sub-process information sorted by a sequence of process execution time. In some embodiments, the operation 320 may be performed by the process processing module 220.

The manufacturing process information may refer to information about processes required for product manufacturing. In some embodiments, the manufacturing process information may include sub-process information sorted in order of process execution time. For example, the manufacturing process information may be "sub-process 1: raw material purification, pulverization and grinding, sub-process 2: mixing, dispersing and emulsification of different raw materials, sub-process 3: sterilization, sub-process 4: filling, sub-process 5: packaging". In some embodiments, the sub-process information may at least include sub-process name information and manufacturing process parameter information. More descriptions of sub-process information may be found in FIG. 1 and related description thereof.

In some embodiments, the process processing module 220 may determine the manufacturing process information based on the first instruction.

In some embodiments, the Industrial Internet of Things may be used for production management of a production line for producing cream cosmetics, and the product manufacturing task may include a manufacturing task for producing cream cosmetics. In some embodiments, to determine the pre-stored manufacturing process information of the product based on the first instruction, the process processing module 220 may further obtain product information based on the first instruction, and determine the manufacturing process information based on the product information.

The product information may refer to the relevant information of the product that needs to be produced. The product information may at least include product name, product type, product specification, product physicochemical properties, or other information.

In some embodiments, a product information table may be matched based on the product information in the first instruction, and a corresponding product type in the product information table or a similar product type that meets the matching requirement may be obtained, and manufacturing process information of the product type or the similar product types that meets matching requirement may be retrieved. More descriptions of determining manufacturing process information may be found in FIG. 1 and related descriptions thereof.

The method described in some embodiments of the present disclosure may determine manufacturing process information according to product information, which is convenient for subsequent feasibility analysis so as to adapt the production of various products such as cream cosmetics.

In operation 330, decomposing the manufacturing process information and generating sub-process manufacturing data. In some embodiments, the operation 330 may be performed by the process processing module 220.

The sub-process manufacturing data may refer to the required relevant data when the sub-process processes and manufactures a product. For example, the sub-process manufacturing data may be a detection process: 100 parts need to be detected, which takes 120 hours in total.

In some embodiments, after receiving the first instruction, the main platform of the service platform may retrieve pre-stored manufacturing process information of a corresponding product based on the product information, and decompose the process based on the manufacturing process information, obtain a plurality of sub-process information sorted by the sequence of the process execution time, and extract a plurality of sub-process name information corresponding to the plurality of sub-process information, send the sub-process information and the manufacturing volume information to the sub-platforms of the service platform corresponding to sub-process name based on the sub-process names information. After receiving the sub-process information and the manufacturing volume information, the sub-platforms of the service platform may calculate a total manufacturing time of the sub-process, integrate the sub-process information, the manufacturing volume information, and the total manufacturing time as a corresponding sub-process manufacturing data and send the corresponding sub-process manufacturing data to a main platform of the management platform. More descriptions of the above-mentioned embodiments may be found in FIG. 1 and related descriptions thereof.

In operation 340, composing a set of manufacturing data based on the sub-process manufacturing data and the process execution time. In some embodiments, the operation 340 may be performed by the analysis module 230.

The process execution time may refer to the time when the sub-process performs the corresponding operation in the product manufacturing. For example, the process execution time of sub-process 1 may be 20 minutes after the start of the manufacturing task.

A set of manufacturing data may refer to a collection consisting of sub-process manufacturing data. For example, the set of manufacturing data may be: purification, pulverization, and grinding processes, obtaining 100 kg of raw materials by processing, taking 3 hours in total, and completing the processing within 0 to 5 hours after the start of the manufacturing task, etc.

In some embodiments, the main platform of the management platform may receive all sub-process manufacturing data and compose a set of manufacturing data in sequence of process execution time. More descriptions of the above-mentioned embodiments may be found in FIG. 1 and related descriptions thereof.

In some embodiments, the analysis module 230 may also compose the set of manufacturing data based on data information such as the sequence of time spent for performing the sub-processes, the processing locations of the sub-processes, or the like. The composition rule of the set of manufacturing data may be set according to actual needs, which is not limited in the present disclosure.

In operation 350, performing a manufacturing feasibility analysis based on the set of manufacturing data. In some embodiments, the operation 350 may be performed by the analysis module 230.

A manufacturing feasibility analysis may refer to an analyzing whether a product manufacturing task may be accomplished. The manufacturing feasibility analysis may include feasibility analysis of manufacturing material and object platform feasibility analysis.

A feasibility analysis of manufacturing material may refer to an analysis of whether a manufacturing material meets the requirements of a production task. For example, the feasibility analysis of manufacturing material may include analyzing whether the volume, quality, etc. of the manufacturing materials meet the requirements of the production task. More descriptions of feasibility analysis of manufacturing material may be found in FIG. 5 and related descriptions thereof.

The feasibility analysis of object platform may refer to analyzing whether the space time of the manufacturing equipment meets the requirements of the production task. More descriptions of the feasibility analysis of object platform may be found in FIG. 7 and related descriptions thereof.

In some embodiments, the analysis module 230 may perform a manufacturing feasibility analysis based on the set of manufacturing data. In some embodiments, the analysis module 230 may perform feasibility analysis of the manufacturing material based on the manufacturing volume information in the set of manufacturing data. More descriptions of the above-mentioned embodiments may be found in FIG. 1 and related descriptions thereof.

In some embodiments, the analysis module 230 may determine the loss rate of the required manufacturing material of the sub-process based on the prediction model. Further, the analysis module 230 may determine an actual required volume of the manufacturing material of the sub-process based on the loss rate and manufacturing volume information; and determine manufacturing material feasibility based on the actual required volume and an inventory balance corresponding to the manufacturing material. More descriptions of the above-mentioned embodiments may be found in FIG. 5 and related descriptions thereof.

In some embodiments, the analysis module 230 may determine the total manufacturing time of each sub-process, and determine an object platform feasibility by comparing the total manufacturing time of each sub-process with a space time of the at least one object platform corresponding to the sub-process. More descriptions of the above-mentioned embodiments may be found in FIG. 7 and related descriptions thereof.

In some embodiments, the analysis module 230 may also determine a production plan feasibility of each sub-process based on the manufacturing material feasibility or the object platform feasibility of each sub-process. More descriptions of the above embodiments may be found in FIG. 7 and related descriptions thereof.

In operation 360, in response to a determination that an analysis result of the manufacturing feasibility analysis is feasible, performing the product manufacturing corresponding to the sub-process based on the sub-process manufacturing data. In some embodiments, the operation 360 may be performed by an analysis module.

In some embodiments, in response to a determination that an analysis result of the manufacturing feasibility analysis is feasible, performing the product manufacturing corresponding to the sub-process based on the sub-process manufacturing data. More descriptions of the above-mentioned embodiments may be found in FIG. 1 and related descriptions thereof.

In some embodiments of the present disclosure, by analyzing the feasibility of the product manufacturing task, it is pre-determined whether the product manufacturing task may be completed, which may avoid the problem of product manufacturing interruption caused by the failure of a certain sub-process to be implemented. At the same time, it may also reflect the volume of the required materials of the product manufacturing and the efficiency of manufacturing equipment, so that subsequent adjustments may be made on the production line, thereby further improving the efficiency of product manufacturing.

FIG. 4 illustrates another exemplary flowchart of the control method of the Industrial Internet of Things for automatic executing product manufacturing based on the task according to some embodiments of the present disclosure. As shown in FIG. 4, the process 400 may include the following operations. In some embodiments, the process 400 may be performed by the Industrial Internet of Things 200 for automatic executing product manufacturing based on the task.

In some embodiments, the Industrial Internet of Things for automatic executing product manufacturing based on a task may include a user platform, a service platform, a management platform, a sensor network platform, and at least one object platform interacting sequentially from top to bottom.

Both the service platform and the management platform may adopt a front sub-platform arrangement, and the sensor network platform may adopt a centralized arrangement. The front sub-platform arrangement may mean that the service platform and the management platform are provided with a main platform and a plurality of sub-platforms, the plurality of sub-platforms may store and process data of different types or different receiving objects sent by a lower-level platform respectively, and the main platform may aggregate, store and process the data of the plurality of sub-platforms, and transmit the data to an upper-level platform. The centralized arrangement may mean that the sensor network platform uniformly receives data, uniformly processes data, and uniformly sends data.

In operation 410, when the user platform generates the product manufacturing task based on a user, sending the product manufacturing task to a main platform of the service platform as a first instruction, and the first instruction at least including product information and manufacturing volume information in the product manufacturing task.

In operation 420, after receiving the first instruction, the main platform of the service platform retrieving pre-stored manufacturing process information of a corresponding product based on the product information, decomposing the process based on the manufacturing process information, obtaining a plurality of sub-process information sorted by the sequence of the process execution time, extracting a plurality of sub-process name information corresponding to the plurality of sub-process information, and sending the sub-process information and the manufacturing volume information to the sub-platforms of the service platform corresponding to sub-process names based on the sub-process name information.

In operation 430, after receiving the sub-process information and the manufacturing volume information, the sub-platforms of the service platform calculating a total manufacturing time of the sub-process, integrating the sub-process information, the manufacturing volume information, and the total manufacturing time as a corresponding sub-process manufacturing data and sending the corresponding sub-process manufacturing data to a main platform of the management platform.

In operation 440, the main platform of the management platform receiving all sub-process manufacturing data and composing the set of manufacturing data based on the sequence of process execution time, and performing the manufacturing feasibility analysis based on the set of manufacturing data, in response to a determination that an analysis result of the manufacturing feasibility analysis is feasible, the main platform of the management platform executing the following operations:

In operation 450, sending all the sub-process manufacturing data to sub-platforms of the management platform corresponding to the sub-process.

In operation 460, after receiving the sub-process manufacturing data, the sub-platforms of the management platform performing object platform matching, and sending the sub-process manufacturing data to the sensor network platform.

In operation 470, the sensor network platform receiving the sub-process manufacturing data and sending the sub-process manufacturing data to the at least one object platform that is matched, and the at least one object platform receiving the sub-process manufacturing data and executing the product manufacturing of the corresponding sub-process based on the sub-process manufacturing data.

In some embodiments of the present disclosure, through the feasibility analysis of manufacturing material and the object platform feasibility analysis, it is confirmed whether the intelligent manufacturing equipment may perform manufacturing, so that the Industrial Internet of Things can realize the function of automatically executing product manufacturing based on tasks.

FIG. 5 illustrates an exemplary flowchart of determining the feasibility of manufacturing material according to some embodiments of the present disclosure. In some embodiments, the process 500 may be performed by the Industrial Internet of Things for automatic executing product manufacturing based on the task.

In operation 510, processing required material information, standard quality parameters, and sub-process categories of the sub-process based on the prediction model corresponding to the sub-process, and determining a loss rate of manufacturing material of the sub-process.

The required material information may refer to information about materials required in production. In some embodiments, the required material information may include the type of the required material, the proportion of the required material, the performance characteristics of each required material, etc. The performance characteristics of each required material may be related to the manufacturer, production batch, or other factors. For example, in the emulsification sub-process, the required material information may include the type of emulsifier, the proportion of the emulsifier, the lipophilic and hydrophilic balance (HLB) of the emulsifier, etc.

The standard quality parameters may refer to the parameters required in production to achieve production quality standards. In some embodiments, the standard quality parameter may be associated with the category of the corresponding sub-process. For example, in the grinding sub-process, the standard quality parameters may include the diameter of the particles after grinding, the uniformity of the particles after grinding, etc. In the emulsification sub-process, the standard quality parameters my include the degree of emulsification of the required materials, etc. In the filling sub-process, the standard quality parameters may include standard filling quality interval, etc.

The sub-process category may refer to the process category to which the sub-process belongs in the production. In some embodiments, for the product manufacturing task of producing cream cosmetics, the sub-process category may include a purification sub-process, a pulverization sub-process, a grinding sub-process, or the like.

The loss rate of the manufacturing material may refer to the proportion of the manufacturing material that is wasted to manufacturing material the in the production of the sub-process. The loss of manufacturing materials may include, but is not limited to, worker mistakes, materials attached to production equipment, or the like.

In some embodiments, the loss rate of the manufacturing material may be obtained based on statistics, for example, the normal usage of the manufacturing material may be determined by counting the number of finished products, and then the loss rate of the manufacturing material may be determined based on the normal usage and the total volume of the material.

In some embodiments, the loss rate of the manufacturing material may also be obtained based on a prediction method, for example, a prediction model.

In some embodiments, the input of the prediction model may include required material information, standard quality parameters, sub-process category of the sub-process, and the output of the prediction model may include may be the loss rate of the manufacturing material of the sub-process. In some embodiments, the output of the prediction model may also be the respective loss rates of various manufacturing materials in the sub-process. For example, the output of the prediction model may be [a, b, c, . . . ], where the "a" may represent the loss rate corresponding to the manufacturing material A, the "b" may represent the loss rate corresponding to the manufacturing material B, and the "c" may represent the loss rate corresponding to the manufacturing material C, etc.

Figure 6:
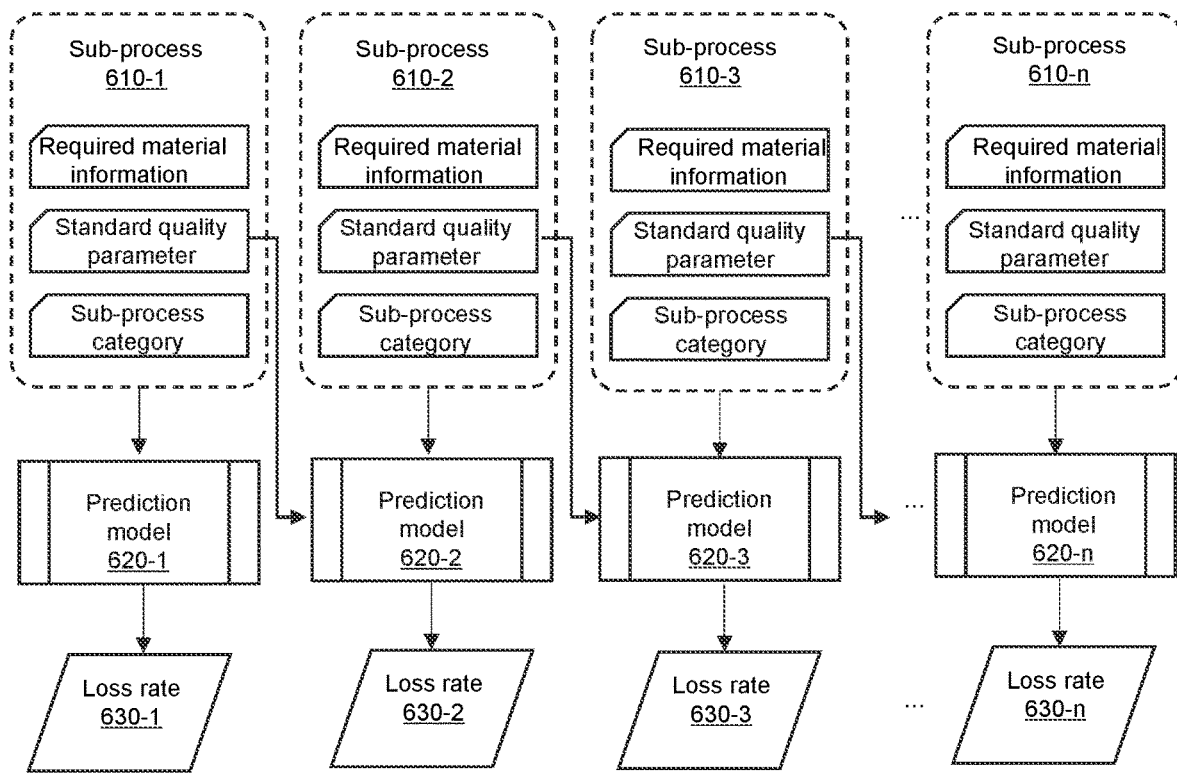
FIG. 6 illustrates an exemplary schematic diagram of determining the loss rate of the manufacturing material according to some embodiments of the present disclosure.

In some embodiments, each of the plurality of sub processes has a corresponding prediction model. As an example only, as shown in FIG. 6, the sub-process 610-1 may have a corresponding prediction model 620-1, the sub-process 610-2 may have a corresponding prediction model 620-2, and the sub-process 610-3 may have a corresponding prediction model 620-3, . . . , and the sub-process 610-$n$ may have a corresponding prediction model 620-$n$.

In some embodiments, for each of the plurality of the sub-processes, the analysis module 230 may process the required material information, standard quality parameters, and sub-process categories of the sub-process based on the prediction model corresponding to the sub-process to determine the loss rate of the manufacturing material of the sub-process. As shown in FIG. 6, the prediction model 620-1, the prediction model 620-2, . . . , and the prediction model 620-$n$ may respectively process the required material information, the standard quality parameters, and the sub-process categories of the sub-process 610-1, the sub-process 610-2, . . . , and the sub-process 610-$n$ to determine the loss rate 630-1, the loss rate 630-2, . . . , and the loss rate 630-$n$.

It should be noted that the structure and parameters of the prediction model corresponding to each sub-process may be the same, and the input of the prediction model corresponding to each sub-process may not be the same, i.e., the information related to the respective sub-process.

In some embodiments, the input of the prediction model may also include the standard quality parameters of the previous sub-process. As shown in FIG. 6, the input of the prediction model 620-2 corresponding to the sub-process 610-2 may further include the standard quality parameters of the sub-process 610-1, and the input of the prediction model 620-3 corresponding to the sub-process 610-3 may also include the standard quality parameter of the sub-process 610-2, and so on.

It should be noted that there may be a potential correlation between the loss rates of each sub-process. When the standard quality parameters required by the previous sub-process are different, the output semi-finished materials may have different losses in the next sub-process. If the standard quality parameters of the previous sub-process are required to be high, the product quality of the previous sub-process may be higher. Correspondingly, the quality of the materials used in the next sub-process may be better, so the loss rate of the next sub-process may be lower. For example, if the standard quality parameters of the grinding sub-process are higher, the particles after grinding may be smaller, and the smaller particles may be mixed more uniformly in the next mixing sub-process. Correspondingly, the loss rate of the mixing sub-process is lower.

In some embodiments of the present disclosure, by inputting the standard quality parameters of the previous sub-process into the prediction model, the model may be made to further analyze the loss rate of the manufacturing material required by the sub-processes according to the potential correlation between the loss rate of each process, so that the prediction results of the model are more accurate.

In some embodiments, the prediction model corresponding to each sub-process in the plurality of sub-processes may be obtained through joint training. In some embodiments, the joint training may include: obtaining the training samples and labels corresponding to each sub-process, the training samples including the required material information, the standard quality parameters, and the sub-process categories corresponding to each sub-process, and the labels including the loss rate of the manufacturing material required for each sub-process, inputting the training samples and the labels into an initial prediction model corresponding to each sub-process, and determining a prediction result corresponding to each sub-process, constructing a loss term corresponding to each sub-process based on the prediction result and the labels, determining a weight of the loss term corresponding to each sub-process based on a production sequence of the plurality of sub-processes, determining a loss function by fusing the loss terms corresponding to each sub-process based on the weight, and synchronously updating parameters of the initial prediction model corresponding to each sub-process based on the loss function, and ending the training when a preset condition is met. The preset conditions may be that the loss function converges, the number of iterations reaches a threshold, etc.

In some embodiments, a weight of the loss term corresponding to each sub-process may be determined based on a production sequence of the plurality of sub-processes. In some embodiments, if the sub-process is in the early stage of the manufacturing process, the weight of the loss item may be larger; if the sub-process is in the later stage of the manufacturing process, the weight of the loss item may be smaller. In some embodiments, the weight ratio of the loss term between the earlier sub-process and the later sub-process may be within a range of 1.05-1.2.

In some embodiments of the present disclosure, the weight of the loss item corresponding to the sub-process is determined by the production sequence of the plurality of sub-processes, and the training may be carried out for the earlier sub-process in the early stage of model training, the prediction accuracy of the prediction model corresponding to the earlier sub-process is improved, and then the training may be carried out for the later sub-process in the later stage of model training to optimize the model, thereby speeding up the convergence speed.

In operation 520, determining an actual required volume of the manufacturing material of the sub-process based on the loss rate and manufacturing volume information.

The manufacturing volume information may refer to the volume of products required to be manufactured. For example, the manufacturing volume information may be producing 1000 pieces of cosmetic A.

The actual required volume may refer to the actual volume of the manufacturing material required to complete the corresponding product in sub-process production. In some embodiments, the actual required volume may be related to actual production conditions. For example, when there is abnormal consumption of the material in actual production, the actual required volume may include the volume of the material corresponding to the abnormal consumption in addition to the volume of the material normally consumed.

In some embodiments, the analysis module 230 may determine the theoretical required volume of each manufacturing material based on the manufacturing volume information, and then determine the actual required volume based on the theoretical required volume and the loss rate. In some embodiments, the actual required volume may be calculated by the following formula: the actual required volume of each material in each sub-process=the theoretical required volume of the material in the sub-process×(1+the loss rate of the material in the sub-process). For example, if 1000 pieces of cosmetic A are actually manufactured, in the mixing sub-process, each cosmetic A theoretically requires 50 mL of water-phase raw material B, and the loss rate of the water-phase raw material B in the mixing sub-process is 1%, the theoretical required volume of the water-phase raw material B in the mixing sub-step is 50 L may be determined, and the actual required volume may be 50.5 L based on the above formula.

In operation 530, determining manufacturing material feasibility based on the actual required volume and an inventory balance corresponding to the manufacturing material.

The inventory balance may refer to the inventory volume of the manufacturing material available for using. In some embodiments, the management platform may include a counter that collects the inventory balance data for counting the inventory balance of the manufacturing material available on the production line.

In some embodiments, the analysis module 230 may determine the manufacturing material feasibility based on the actual required volume of each manufacturing material in each sub-process and the corresponding inventory balance of the manufacturing material. For example, if the actual required volume is less than or equal to the inventory balance, then the manufacturing material feasibility is feasible.

If the manufacturing material feasibility is feasible, the product manufacturing of the corresponding sub-process may be performed based on the sub-process manufacturing data. More descriptions of performing the product manufacturing of corresponding sub-processes may be found in FIG. 1, FIG. 4, and related descriptions thereof. If the manufacturing materials feasibility is not feasible, reminder information may be sent to the corresponding management sub-platform. After receiving the reminder information, the management sub-platform may match the object platform, and send the reminder information to the sub-platform of the object platform through the corresponding sub-platform of the sensor network to remind the corresponding intelligent manufacturing equipment to replenish the required manufacturing materials in time. The reminder information may be used to remind manufacturing equipment to replenish inventory. For example, the reminder information may include the type and volume of the manufacturing material that need to be replenished.

In some embodiments of the present disclosure, by comparing the relationship between the actual required volume and the inventory balance of each manufacturing material in each sub-process, the manufacturing material feasibility may be determined to provide a decision basis for the product manufacturing plan. At the same time, corresponding operation instructions may be executed in time according to different feasibility analysis results. When the analysis result is feasible, the product manufacturing of the corresponding sub-process may be carried out, when the analysis result is infeasible, the system may be reminded to replenish the inventory in time to avoid production stoppage and missed work due to insufficient materials.

It should be noted that the above descriptions about the processes 300, 400, and 500 are only for example and illustration, and do not limit the scope of application of the present disclosure. For those skilled in the art, various modifications and changes may be made to the processes 300, 400 and 500 under the guidance of the present disclosure. However, these modifications and changes are still within the scope of the present disclosure.

Figure 7:
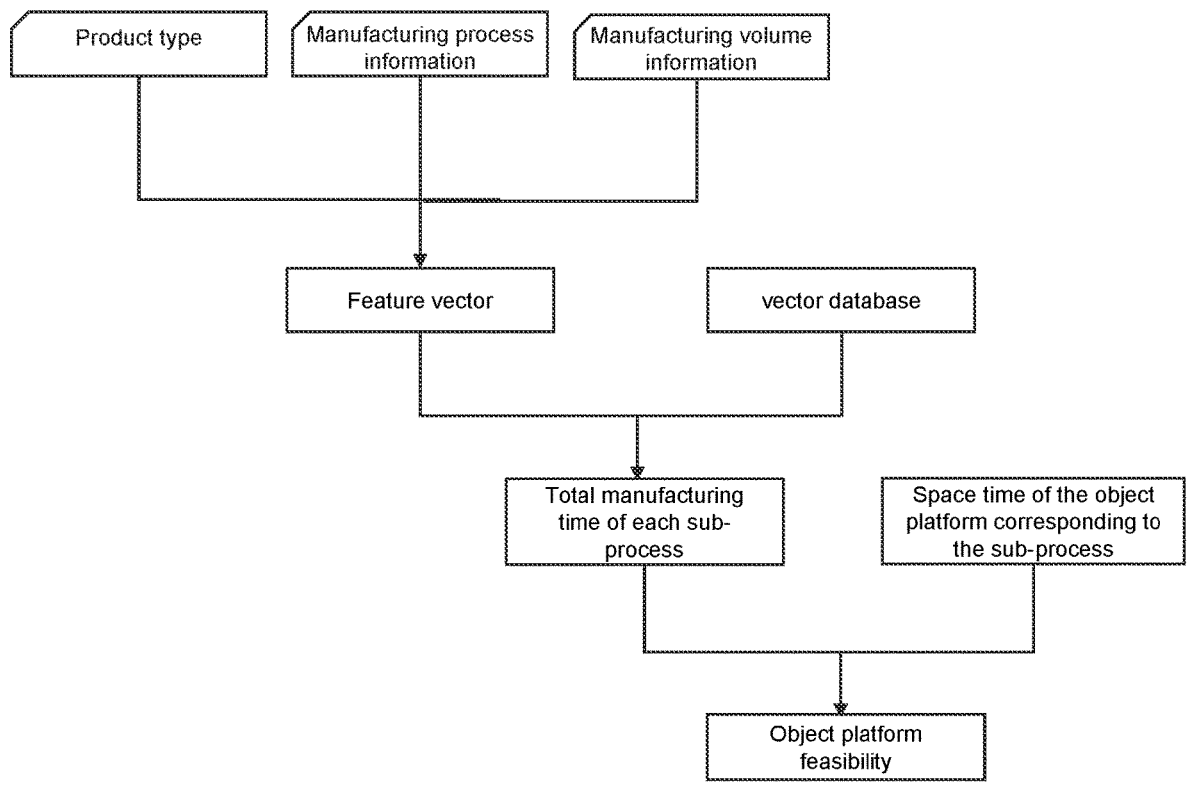
FIG. 7 illustrates an exemplary schematic diagram of determining the object platform feasibility according to some embodiments of the present disclosure.

FIG. 7 illustrates an exemplary schematic diagram of determining the object platform feasibility according to some embodiments of the present disclosure.

In some embodiments, the analysis module 230 may construct a feature vector based on the product type, the manufacturing process information, and the manufacturing volume information. For example only, the feature vector may be [a, b, c], where the "a" may represent the product type (for example, the product type is solid, the "a" may be 1, the product type is paste, the "a" may be 2, etc.), the "b" may represent the manufacturing process information (for example, when the manufacturing process includes the purification, the pulverization and the grinding, the "b" may be 1, and the manufacturing process includes the mixing, the dispersing and the emulsification, and the "b" may be 2, etc.), the "c" may represent the manufacturing volume information (for example, the manufacturing volume is 58 pieces, and the "c" may be 58). In some embodiments, when the manufacturing process information includes a plurality of sub-processes, the constructed feature vector may be multiple, which correspond to the plurality of sub-processes respectively. For example, the feature vector 1 corresponding to the sub-process 1 is [a1, b1, c1], and the feature vector 2 corresponding to the sub-process is [a2, b2, c2], etc.

In some embodiments, the analysis module 230 may perform a search in a vector database based on the feature vector to determine the total manufacturing time of each sub-process.

The vector database may include historical vectors constructed according to the product type, the manufacturing process information, and the manufacturing volume in the historical manufacturing data. The way of constructing the history vector is similar to the way of constructing the feature vector.

Each history vector in the vector database may correspond to the total manufacturing time of each sub-process. The total manufacturing time may refer to the time for completing the manufacturing task corresponding to the current process. For example, the history vector A is a feature vector constructed according to the manufacturing data of sub-process 1, and the total manufacturing time corresponding to the sub-process is 5 h, then the total manufacturing time associated with the history vector A is 5 h.

In some embodiments, the analysis module 230 may calculate the vector similarity between the feature vector and each historical vector in the vector database. The vector similarity may reflect the similarity between manufacturing data. Taking the Euclidean distance "x" as an example, the calculation formula of the vector similarity may be 1/(1+x2), and the vector similarity may be a real number between 0-1. The closer the value is to 1, the higher the similarity between the manufacturing data to be determined and the historical manufacturing data is. The manner of calculating the vector similarity may include, but is not limited to, the Euclidean distance, the cosine distance, the Markov distance, the Chebyshev distance, the Manhattan distance, or the like.

In some embodiments, the analysis module 230 may perform a search in a vector database based on the vector similarity to determine the reference vector. The reference vector may refer to a history vector in the vector database that is highly similar to the feature vector. For example, the analysis module 230 may retrieve one or more historical vectors whose vector similarity with the feature vector is greater than a preset threshold (e.g., 0.7) in the vector database as reference vectors.

In some embodiments, the analysis module 230 may determine the total manufacturing time associated with the reference vector as the total manufacturing time of the sub-process corresponding to the feature vector.

In some embodiments, when a plurality of reference vectors are determined, the analysis module 230 may process the total manufacturing time of the sub-processes corresponding to the plurality of reference vectors to determine the total manufacturing time of the sub-process. For example, the total manufacturing time of the sub-processes corresponding to the plurality of reference vectors may be averaged, and the average value may be used as the total manufacturing time of the sub-process.

In some embodiments, the analysis module 230 may determine an object platform feasibility by comparing the total manufacturing time of each sub-process with a space time of the at least one object platform corresponding to the sub-process.

The space time of the object platform may refer to the space time of the manufacturing equipment configured in the object platform. For example, 120 minutes, 100 hours, etc.

In some embodiments, the analysis module 230 may determine the space time of the object platform based on the total working time of the object platform corresponding to the sub-process, the production manufacturing volume of the object platform corresponding to the previous sub-process, and the manufacturing efficiency of the object platform corresponding to the sub-process. Exemplarily, the space time of the object platform=the total working time of the object platform corresponding to the sub-process-(the production manufacturing volume of the object platform corresponding to the previous sub-process)/(the manufacturing efficiency of the sub-process corresponding to the object platform). For example, the total working time of the object platform corresponding to sub-process A may be 20 hours, the production manufacturing volume of the object platform corresponding to the previous sub-process B may be 100 pieces, and the manufacturing efficiency of the object platform corresponding to the sub-process may be 20 pieces/hour, correspondingly, the space time of the object platform corresponding to the sub-process may be 15 hours.

It should be noted that some sub-processes may require manual participation. Correspondingly, the space time of the object platform may also include equipment space time and manual space time.

In some embodiments, the analysis module 230 may determine the space time of the equipment based on the total working time of the manufacturing equipment, the production manufacturing volume of the object platform corresponding to the previous sub-process, and the working efficiency of the manufacturing equipment. Exemplarily, the space time of the equipment=the total working time of the manufacturing equipment-(the production manufacturing volume of the object platform corresponding to the previous sub-process)/(the working efficiency of the manufacturing equipment). For example, the total working time of the manufacturing equipment may be 17 hours, the production manufacturing volume of the previous sub-process may be 300 pieces, and the working efficiency of the manufacturing equipment may be 30 pieces/hour, correspondingly, the space time of the equipment may be 7 hours.

In some embodiments, the analysis module 230 may determine the manual space time based on the total manual working time, the production manufacturing volume of the object platform corresponding to the previous sub-process, and the manual working efficiency. The manual efficiency may be determined based on the historical production data of the workers in the sub-process. Exemplarily, manual space time=total manual working time-(the production manufacturing volume of the object platform corresponding to the previous sub-process)/(manual working efficiency). For example, the total manual working time may be 8 hours, the production manufacturing volume of the previous sub-process may be 70 pieces, and the manual working efficiency may be 10 pieces/hour, correspondingly, the manual space time may be 1 hour.

In some embodiments, when there is a worker change in the sub-process, the analysis module 230 may calculate the manual space time of different workers respectively, and add the manual space time of different workers to obtain the final manual space time. For example, if the workers responsible for the sterilization process are M and N, and their manual space time is 1.5 hours and 0.8 hours, respectively, the final manual space time is 2.3 hours.

In some embodiments, the analysis module 230 may use the smaller value of the equipment space time and the manual space time of each object platform as the final space time of the object platform. For example, if the equipment space time may be 3.2 hours, and the artificial space time may be 2.1 hours, the space time of the object platform may be 2.1 hours.

In some embodiments, the analysis module 230 may determine an object platform feasibility by comparing the total manufacturing time of each sub-process with a space time of the at least one object platform corresponding to the sub-process. When the total manufacturing time of the sub-process is less than or equal to the space time of the object platform corresponding to the sub-process, the analysis module 230 may determine that the analysis result of the object platform feasibility is feasible. When the total manufacturing time of the sub-process is greater than the space time of the object platform corresponding to the sub-process, the analysis module 230 may determine that the analysis result of the object platform feasibility is infeasible.

In some embodiments of the present disclosure, the historical manufacturing data may be used as a reference, and the space time of the object platform may be determined by vector mode, thereby determining the object platform feasibility, i.e., the feasibility of manufacturing equipment, which provides the accurate basis for subsequent determination of manufacturing feasibility analysis.

In some embodiments, the analysis module 230 may also determine a production plan feasibility of each sub-process based on the manufacturing material feasibility or the object platform feasibility of each sub-process.

The production plan of the sub-process may refer to the task of the finished product or semi-finished product to be processed by the sub-process. For example, the production plan of the filling process may be to fill 1000 semi-finished creams within 10 hours.

In some embodiments, the analysis module 230 may score the manufacturing material feasibility of each sub-process to obtain a first score, and score the object platform feasibility of each sub-process to obtain a second score. Further, the analysis module 230 may comprehensively obtain a third score corresponding to the production plan feasibility of each sub-process based on the first score and the second score. The higher the third score is, the higher the production plan feasibility of the sub-process is.

In some embodiments, the analysis module 230 may determine the first score based on the proportion of the actual required volume of each manufacturing material to the inventory balance. The smaller the proportion of the actual required volume of each manufacturing material to the inventory balance is, the higher the first score is. The analysis module 230 may preset a corresponding relationship between the proportion of the actual required volume of each manufacturing material to the inventory balance and the first score. The first score corresponding to the proportion between 0-30% may be 100, the first score corresponding to the proportion between 30-60% may be 80, the first score corresponding to the proportion between 60-90% may be 60, the first score corresponding to the proportion of more than 90% may be 50. Correspondingly, the first score may be determined according to the interval in which the proportion is located.

In some embodiments, the analysis module 230 may determine the second score based on the proportion of the total manufacturing time of each sub-process to the space time of the object platform. The smaller the proportion of the total manufacturing time of each sub-process to the space time of the object platform is, the higher the second score is. Similar to the first score, the analysis module 230 may also preset the corresponding relationship between the proportion of the total manufacturing time of each sub-process to the space time of the object platform and the second score, and accordingly, the second score may be determined according to the interval in which the proportion is located.

In some embodiments, the analysis module 230 may perform a weighted sum of the first score and the second score to determine a third score. The weight corresponding to the first score and the weight corresponding to the second score may be system default values, experience values, artificial preset values, etc., or any combination thereof, and may be set according to actual needs, which are not limited in the present disclosure. It should be noted that a sum of the weight corresponding to the first score and the weight corresponding to the second score needs to be 1.

In some embodiments, the analysis module 230 may also determine the feasibility score of each production line according to the second score of each sub-process on each production line. For example, a weighted sum of the second score of each sub-process of each production line may be performed to determine the feasibility score of the corresponding production line. Correspondingly, a production line with a high feasibility score may be preferentially arranged to perform corresponding product manufacturing. The product manufacturing efficiency may be improved by selecting the optimal production line to perform product manufacturing.

In some embodiments of the present disclosure, by carrying out comprehensive quantitative analysis on the manufacturing material feasibility and the object platform feasibility of each sub-process, the feasibility of the production plan of each sub-process may be more accurately determined, thereby, the feasibility of the product manufacturing task may be determined, and the product manufacturing efficiency may be improved.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An Industrial Internet of Things for automatic executing product manufacturing based on a task, comprising a task module, a process processing module, and an analysis module; and the Industrial Internet of Things including a user platform, a service platform, a management platform, a sensor network platform, and at least one object platform interacting sequentially from top to bottom; wherein the user platform is used as an executor of the task module, the service platform is used as an executor of the process processing module, and the management platform, the sensor network platform, and the at least one object platform are used as executors of the analysis module; wherein the task module is executed by a server and configured to generate a product manufacturing task and a first instruction corresponding to the product manufacturing task;

the process processing module is executed by the server and configured to determine manufacturing process information based on the first instruction, wherein the manufacturing process information includes sub-process information sorted by a sequence of process execution time;

decompose the manufacturing process information and generate sub-process manufacturing data; and the analysis module is executed by the server and configured to compose a set of manufacturing data based on the sub-process manufacturing data and the process execution time;

perform a manufacturing feasibility analysis based on the set of manufacturing data; and in response to a determination that an analysis result of the manufacturing feasibility analysis is feasible, perform the product manufacturing corresponding to sub-process based on the sub-process manufacturing data, wherein both the service platform and the management platform adopt a front sub-platform arrangement, and the sensor network platform adopts a centralized arrangement; the front sub-platform arrangement means that the service platform and the management platform are provided with a main platform and a plurality of sub-platforms, the plurality of sub-platforms store and process data of different types or different receiving objects sent by a lower-level platform respectively, and the main platform aggregates, stores and processes the data of the plurality of sub-platforms, and transmits the data to an upper-level platform, the centralized arrangement means that the sensor network platform uniformly receives data, uniformly processes data, and uniformly sends data;

when the user platform generates the product manufacturing task based on a user, the product manufacturing task is sent to a main platform of the service platform as a first instruction; and the first instruction at least includes product information and manufacturing volume information in the product manufacturing task;

after receiving the first instruction, the main platform of the service platform retrieves pre-stored manufacturing process information of a corresponding product based on the product information, and decomposes the process based on the manufacturing process information, obtains a plurality of sub-process information sorted by the sequence of the process execution time, and extracts a plurality of sub-process name information corresponding to the plurality of sub-process information, sends the sub-process information and the manufacturing volume information to the sub-platforms of the service platform corresponding to sub-process names based on the sub-process name information;

after receiving the sub-process information and the manufacturing volume information, and the sub-platforms of the service platform calculate a total manufacturing time of the sub-process, integrate the sub-process information, the manufacturing volume information, and the total manufacturing time as a corresponding sub-process manufacturing data and send the corresponding sub-process manufacturing data to a main platform of the management platform;

the main platform of the management platform receives all sub-process manufacturing data and composes the set of manufacturing data based on the sequence of process execution time, and performs the manufacturing feasibility analysis based on the set of manufacturing data, in response to a determination that an analysis result of the manufacturing feasibility analysis is feasible, the main platform of the management platform executes:

sending all the sub-process manufacturing data to sub-platforms of the management platform corresponding to the sub-process;

after receiving the sub-process manufacturing data, the sub-platforms of the management platform performing object platform matching, and sending the sub-process manufacturing data to the sensor network platform; and the sensor network platform receiving the sub-process manufacturing data and sending the sub-process manufacturing data to the at least one object platform that is matched, and the at least one object platform receiving the sub-process manufacturing data and executing the product manufacturing of the corresponding sub-process based on the sub-process manufacturing data.

2. The Industrial Internet of Things for automatic executing product manufacturing based on the task of the claim 1, wherein after receiving the first instruction, the main platform of the service platform retrieves a product information table pre-stored in the main platform of the service platform, and the product information table at least includes product type information and the manufacturing process information corresponding to the product type;

the product information table is matched based on the product information in the first instruction, and a corresponding product type in the product information table or a similar product type that meets matching requirements is obtained; and the manufacturing process information of the product type or the similar product type that meets the matching requirements are retrieved, and the process is decomposed based on the manufacturing process information, and the plurality of sub-process information sorted by the sequence of the execution process time is obtained.

3. The Industrial Internet of Things for automatic executing product manufacturing based on the task of the claim 1, wherein the main platform of the service platform extracts a plurality of sub-process name information corresponding to the sub-process information, sends the sub-process information and the manufacturing volume information to sub-platforms of the service platform corresponding to sub-process names based on the sub-process name information comprising:

each different sub-process corresponding to an independent sub-platform of the service platform;

when obtaining the plurality of sub-process information sorted by the sequence of the execution process time, the main platform of the service platform extracting the sub-process name information in each sub-process information respectively; and sending the sub-process information and the manufacturing volume information to the sub-platforms of the service platform corresponding to the sub-process names based on the sub-process name information.

4. The Industrial Internet of Things for automatic executing product manufacturing based on the task of the claim 2, wherein the first instruction further includes task product manufacturing process information and task product manufacturing process parameters in the product manufacturing task;

when matching the product information table based on the product information in the first instruction, in response to a determination that the corresponding product type is not matched, the manufacturing process information in the product information table is matched based on the task product manufacturing process information; and when meeting the matching requirements, the product type corresponding to a matched manufacturing process information in the product information table is used as the similar product type, and the task product manufacturing process information and the task product manufacturing process parameters are used as the manufacturing process information of the similar product type for process decomposition.

5. The Industrial Internet of Things for automatic executing product manufacturing based on the task of the claim 4, wherein the matching the manufacturing process information in the product information table based on the task product manufacturing process information comprises:

arranging all the sub-processes included in the task product manufacturing process information in sequence to form a target set, and using the manufacturing process information corresponding to each product type in the product information table as independent comparison data, and arranging all the sub-processes included in each independent comparison data in sequence to form comparison sets; and matching the target set and each comparison set individually, in response to a determination that all the sub-processes in the target set are matched to the sub-processes of the corresponding process name in the comparison set, the comparison set meeting the matching requirements, and using the product type corresponding to the comparison set as the similar product type.

6. The Industrial Internet of Things for automatic executing product manufacturing based on the task of the claim 5, wherein when multiple comparison sets meet the matching requirements, the main platform of the service platform executes:

taking any comparison set as a benchmark, sequentially selecting the sub-processes that match the target set, retrieving process sequence numbers of the sub-processes based on the product information table, and calculating sequence number differences of all the process sequence numbers; and calculating sequence number differences of all the comparison sets, and selecting the comparison set with a smallest sequence number difference as the comparison set that finally meets the matching requirements.

7. The Industrial Internet of Things for automatic executing product manufacturing based on the task of the claim 1, wherein the main platform of the management platform receives all sub-process manufacturing data and composes the set of manufacturing data based on the sequence of process execution time, and performs the manufacturing feasibility analysis based on the set of manufacturing data comprising:

the main platform of the management platform receiving all the sub-process manufacturing data, and associating the manufacturing volume information corresponding to the sub-process information and the total manufacturing time in the sub-process manufacturing data;

sorting all the sub-processes in the sub-process manufacturing data according to the sequence of processes execution time based on the sub-process information to form the set of manufacturing data;

performing the manufacturing feasibility analysis based on the manufacturing datasets;

wherein the manufacturing feasibility analysis includes:

analyzing feasibility of manufacturing materials based on the manufacturing volume information in the set of the manufacturing data; and in response to a determination that the analysis result of the feasibility analysis of the manufacturing materials is feasible, analyzing an object platform feasibility based on the total manufacturing time in the set of manufacturing data, and in response to a determination that the analysis result of the feasibility analysis of the at least one object platform is feasible, determining that the set of the manufacturing data is feasible.

8. The Industrial Internet of Things for automatic executing product manufacturing based on the task of the claim 7, wherein the analyzing feasibility of manufacturing materials based on the manufacturing volume information in the set of the manufacturing data comprises:

each different sub-process corresponding to an independent sub-platform of the management platform;

the main platform of the management platform retrieving manufacturing material information of the process in the sub-platforms of the management platform of the corresponding process based on the sub-process information, and calculating a manufacturable volume of the process based on the manufacturing material information;

comparing the manufacturing volume information corresponding to each sub-process with the manufacturable volume of the sub-process:

when the manufacturable volume of the sub-process is greater than or equal to a required manufacturing volume of the manufacturing volume information, determining that the feasibility of manufacturing materials in the sub-process is feasible, otherwise, determining that the feasibility of manufacturing materials in the sub-process is infeasible;

performing feasibility analysis of manufacturing material on each sub-process in the set of the manufacturing data, and based on all analysis results of the sub-processes to execute:

in response to a determination that all the analysis results of feasibility analysis of the manufacturing materials of sub-process are feasible, performing the feasibility analysis of the at least one object platform; and in response to a determination that at least one of the analysis results of feasibility analysis of the manufacturing materials of sub-process is infeasible, determining that the manufacturing dataset is infeasible, and sending the manufacturing material information of an infeasible sub-process to the sub-platforms of the service platform in turn, and the sub-platforms of the service platform sending the manufacturing material information to the main platform of the service platform, and the main platform of the service platform associating the manufacturing material information with the sub-process information of each sub-process and feeding it back to the user platform.

9. The Industrial Internet of Things for automatic executing product manufacturing based on the task of the claim 7, wherein the in response to a determination that the analysis result of the feasibility analysis of the manufacturing materials is feasible, analyzing an object platform feasibility based on the total manufacturing time in the set of manufacturing data, and in response to a determination that the analysis result of the feasibility analysis of the at least one object platform is feasible, determining the set of the set of the manufacturing data is feasible comprises:

each different sub-process corresponding to an independent sub-platform of the management platform;

based on the sub-process information, the main platform of the management platform retrieving working-hour information of the at least one object platform of the sub-process in the sub-platforms of the management platform of the corresponding process, and calculating a sum of all spare working-hour information of the at least one object platform of the sub-process;

comparing the total manufacturing time corresponding to each sub-process with the sum of the spare working-hour information of the sub-process:

when the sum of the spare working-hour information is greater than or equal to the total manufacturing time corresponding to the sub-process in the corresponding sub-process, determining that the object platform feasibility in the sub-process is feasible; otherwise, determining that the object platform feasibility in the sub-process is infeasible;

performing feasibility analysis of the at least one object platform on each sub-process in the set of the manufacturing data, and based on all the analysis results of the sub-process to execute:

in response to a determination that all the analysis results of the feasibility analysis of the at least one object platform in the sub-process are feasible, the set of the manufacturing data meeting manufacturing conditions, and performing a transmission of the sub-process manufacturing data; and in response to a determination that at least one of the analysis results of the feasibility analysis of the at least one object platform in the sub-process is infeasible, determining the set of the manufacturing data is infeasible, sending the working-time information of the at least one object platform of an infeasible sub-process to the sub-platforms of the service platform in turn, the sub-platforms of the service platform sending the working-time information of the at least one object platform to the main platform of the service platform, and the main platform of the service platform associating the working-hour information of the at least one object platform of each sub-process with the sub-process information and feeding it back to the user platform.

10. The Industrial Internet of Things for automatic executing product manufacturing based on the task of the claim 1, wherein the after receiving the sub-process manufacturing data, the sub-platforms of the management platform performing object platform matching, and sending the sub-process manufacturing data to the sensor network platform comprises:

after receiving the sub-process manufacturing data, the sub-platforms of the management platform calculating an executable manufacturing volume of each object platform in all the at least one object platform of the sub-process, wherein the executable manufacturing volume is obtained by dividing a spare working-hour information of each of at least one object platform by a single-piece working-hour;

sorting all the executable manufacturing volumes of the at least one object platform in descending order of numerical value, and selecting the object platforms corresponding to top N executable manufacturing volumes as matching object platforms, wherein a sum of the top N executable manufacturing volumes is greater than or equal to a manufacturing volume in the manufacturing volume information;

the sub-platforms of the management platform allocating an actual manufacturing volume corresponding to each matching object platform according to the manufacturing volume information, wherein a sum of the actual manufacturing volumes of all the matching object platforms are equal to the manufacturing volume in the manufacturing volume information; and replacing the manufacturing volume information in the sub-process manufacturing data with the actual manufacturing volume, and sending replaced sub-process manufacturing data to the sensor network platform.

11. The Industrial Internet of Things for automatic executing product manufacturing based on the task of the claim 1, wherein to determine the pre-stored manufacturing process information of the product based on the first instruction, the process processing module is further configured to:

obtain product information based on the first instruction; and determine the manufacturing process information based on the product information.

12. The Industrial Internet of Things for automatic executing product manufacturing based on the task of the claim 1, wherein the manufacturing process information includes a plurality of sub-processes, and there is a sequential production sequence among the plurality of sub-processes;

to perform manufacturing feasibility analysis based on the set of the manufacturing data, a corresponding prediction model exists for each of the plurality of sub-processes, and for each of the plurality of sub-processes, the analysis module is further configured to:

process required material information, standard quality parameters, and sub-process categories of the sub-process based on the prediction model corresponding to the sub-process, and determine a loss rate of manufacturing material of the sub-process;

determine an actual required volume of the manufacturing material of the sub-process based on the loss rate and manufacturing volume information; and determine manufacturing material feasibility based on the actual required volume and an inventory balance corresponding to the manufacturing material.

13. The Industrial Internet of Things for automatic executing product manufacturing based on the task of the claim 12, wherein an input of the prediction model corresponding to each sub-process in the plurality of sub-processes further includes the standard quality parameters of a previous sub-process.

14. The Industrial Internet of Things for automatic executing product manufacturing based on the task of the claim 12, wherein the analysis module is further configured to:
   obtain the prediction model corresponding to each sub-process in the plurality of the sub-processes through joint training, and the joint training including:
   obtaining training samples and labels corresponding to each sub-process, wherein the training samples include the required material information, the standard quality parameters, and the sub-process categories corresponding to each sub-process, and the labels include the loss rate of the manufacturing material required for each sub-process;
   inputting the training samples and the labels into an initial prediction model corresponding to each sub-process, and determining a prediction result corresponding to each sub-process;
   constructing a loss term corresponding to each sub-process based on the prediction result and the labels;
   determining a weight of the loss term corresponding to each sub-process based on a production sequence of the plurality of sub-processes;
   determining a loss function by fusing the loss terms corresponding to each sub-process based on the weight; and
   synchronously updating parameters of the initial prediction model corresponding to each sub-process based on the loss function, and ending the training when a preset condition is met.

15. The Industrial Internet of Things for automatic executing product manufacturing based on the task of the claim 1, wherein to perform manufacturing feasibility analysis based on the set of the manufacturing data, the analysis module is further configured to:
   construct a feature vector based on product type, manufacturing process information, and manufacturing volume information;
   determine a total manufacturing time of each sub-process by searching in a vector database based on the feature vector; and
   determine an object platform feasibility by comparing the total manufacturing time of each sub-process with a space time of the at least one object platform corresponding to the sub-process.

16. The Industrial Internet of Things for automatic executing product manufacturing based on the task of the claim 12, wherein the analysis module is further configured to:
   determine a production plan feasibility of each sub-process based on the manufacturing material feasibility or the object platform feasibility of each sub-process.

17. A control method of an Industrial Internet of Things for automatic executing product manufacturing based on a task, wherein the Industrial Internet of Things includes: a user platform, a service platform, a management platform, a sensor network platform, and at least one object platform interacting sequentially from top to bottom, and the method includes:
   generating a product manufacturing task and a first instruction corresponding to the product manufacturing task;
   determining manufacturing process information based on the first instruction, wherein the manufacturing process information includes sub-process information sorted by a sequence of process execution time;
   decomposing the manufacturing process information and generating sub-process manufacturing data;
   composing a set of manufacturing data based on the sub-process manufacturing data and the process execution time;
   performing a manufacturing feasibility analysis based on the set of manufacturing data; and
   in response to a determination that an analysis result of the manufacturing feasibility analysis is feasible, performing the product manufacturing corresponding to the sub-process based on the sub-process manufacturing data;
wherein
both the service platform and the management platform adopt a front sub-platform arrangement, and the sensor network platform adopts a centralized arrangement; the front sub-platform arrangement means that the service platform and the management platform are provided with a main platform and a plurality of sub-platforms, the plurality of sub-platforms store and process data of different types or different receiving objects sent by a lower-level platform respectively, and the main platform aggregates, stores and processes the data of the plurality of sub-platforms, and transmits the data to an upper-level platform, the centralized arrangement means that the sensor network platform uniformly receives data, uniformly processes data, and uniformly sends data;
the control method includes:
when the user platform generates the product manufacturing task based on a user, sending the product manufacturing task to a main platform of the service platform as a first instruction; and the first instruction at least including product information and manufacturing volume information in the product manufacturing task;
after receiving the first instruction, retrieving pre-stored manufacturing process information of a corresponding product based on the product information, and decomposing the process based on the manufacturing process information, obtaining a plurality of sub-process information sorted by the sequence of the process execution time, and extracting a plurality of sub-process name information corresponding to the plurality of sub-process information, sending the sub-process information and the manufacturing volume information to the sub-platforms of the service platform corresponding to sub-process names based on the sub-process name information by the main platform of the service platform;
after receiving the sub-process information and the manufacturing volume information, calculating a total manufacturing time of the sub-process, integrating the sub-process information, the manufacturing volume information, and the total manufacturing time as a corresponding sub-process manufacturing data and sending the corresponding sub-process manufacturing data to a main platform of the management platform by the sub-platforms of the service platform;
receiving all sub-process manufacturing data and composing the set of manufacturing data based on the sequence of process execution time, and performing the manufacturing feasibility analysis based on the set of manufacturing data by the main platform of the management platform, in response to a determination that an analysis result of the manufacturing feasibility analysis is feasible, the main platform of the management platform executes:

sending all the sub-process manufacturing data to sub-platforms of the management platform corresponding to the sub-process;

after receiving the sub-process manufacturing data, the sub-platforms of the management platform performing object platform matching, and sending the sub-process manufacturing data to the sensor network platform; and receiving the sub-process manufacturing data and sending the sub-process manufacturing data to the at least one object platform that is matched by the sensor network platform, and receiving the sub-process manufacturing data and executing the product manufacturing of the corresponding sub-process based on the sub-process manufacturing data by the at least one object platform.

18. A non-transitory computer-readable storage medium storing computer instructions, wherein when reading the computer instructions in the storage medium, a computer implements the method of an Industrial Internet of Things for automatic executing product manufacturing based on a task of the claim 17.

* * * * *